(12) United States Patent
Swahn

(10) Patent No.: US 12,143,469 B2
(45) Date of Patent: Nov. 12, 2024

(54) DIGITAL SIGNATURE ENHANCEMENT

(71) Applicant: Alan Earl Swahn, Fairview, PA (US)

(72) Inventor: Alan Earl Swahn, Fairview, PA (US)

(*) Notice: Subject to any disclaimer, the term of this patent is extended or adjusted under 35 U.S.C. 154(b) by 0 days.

(21) Appl. No.: 18/663,888

(22) Filed: May 14, 2024

(65) Prior Publication Data
US 2024/0305444 A1    Sep. 12, 2024

Related U.S. Application Data

(63) Continuation of application No. 17/721,426, filed on Apr. 15, 2022.

(51) Int. Cl.
*H04L 9/06* (2006.01)

(52) U.S. Cl.
CPC ........ *H04L 9/0618* (2013.01); *H04L 2209/20* (2013.01)

(58) Field of Classification Search
CPC ..... H04L 9/0618; H04L 2209/20; H04L 9/14; H04L 9/30
See application file for complete search history.

(56) References Cited

U.S. PATENT DOCUMENTS

| | | | |
|---|---|---|---|
| 8,155,306 B2 | 4/2012 | Brickell et al. | |
| 10,187,200 B1 | 1/2019 | Firestone et al. | |
| 2001/0033656 A1 | 10/2001 | Gligor et al. | |
| 2006/0075246 A1* | 4/2006 | Suga | H04L 9/3247 713/176 |
| 2014/0019764 A1* | 1/2014 | Gopal | H04L 9/3247 713/176 |
| 2022/0311596 A1 | 9/2022 | Bosegaard | |

OTHER PUBLICATIONS

"Disk Encryption" Wikipedia, Wikimedia Foundation, Apr. 26, 2022, https://en.wikipedia.org/wiki/Disk_encryption.
"Digital signature" Wikipedia, Wikimedia Foundation, May 17, 2022, https://en.wikipedia.org/wiki/Digital_signature.

(Continued)

*Primary Examiner* — Ellen Tran
(74) *Attorney, Agent, or Firm* — Cherskov Flaynik & Gurda, LLC

(57) ABSTRACT

A computerized process is described for improving a computer's digital signing capabilities that results in digital signatures that are substantially more secure with enhanced proof of data integrity, signatory authentication, and signatory non-repudiation without modification to underlying signature algorithms. The process utilizes computing resources, plaintext to be signed, and eight asymmetric cryptography digital signature algorithms each utilizing a specified hash algorithm and different private key from a public-private key pair. A novel mechanism is described that copies bit values from common bit positions of plaintext bytes into eight partitions. Each partition of bytes is independently signed using a signature algorithm and the resulting partitions of signed bytes are combined to form a digital signature. As the digital signature verification requires eight signature algorithms each utilizing a specified hash algorithm and a public key from the public-private key pair used for signing, such digital signature is significantly improved over signing with a single signature algorithm utilizing a hash algorithm and key.

16 Claims, 25 Drawing Sheets

(56) References Cited

OTHER PUBLICATIONS

Elaine Barker, Recommendation for Key Management, SP 800-57 Part 1 Rev. 5, NSIT, Finalized May 4, 2020.
Lily Chen, et al, "Report on Post-Quantum Cryptography" NISTIR 8105, Published Apr. 2016.
National Institute of Standards and Technology Canadian Center for Cyber Security, "Implementation Guidance for FIPS 140-2 and the Cryptographic Module Validation Program" Revised Mar. 14, 2022.

* cited by examiner

Pre-encryption: Data Padded, Transformed and Partitioned Illustration

Data:

| Byte # | 1 | 2 | 3 | 4 | 5 | 6 | 7 | 8 |
|---|---|---|---|---|---|---|---|---|
| Bytes | 01000001 | 01000010 | 01000011 | 01000100 | 01000101 | 01000110 | 01000111 | 01001000 |

↑ Most significant bit in byte

| Hex format | 41 | 42 | 43 | 44 | 45 | 46 | 47 | 48 |

201

Padded Data:

| Byte # | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Hex | 08 | 00 | 00 | 00 | 00 | 00 | 00 | 00 | 00 | 00 | 00 | 41 | 42 | 43 | 44 | 45 | 46 | 47 | 48 |

202

Transformed and Partitioned:

|  | Byte #1 | Byte #2 |
|---|---|---|
| Partition #1 | 00 | 55 |
| Partition #2 | 00 | 66 |
| Partition #3 | 00 | 78 |
| Partition #4 | 01 | 80 |
| Partition #5 | 00 | 00 |
| Partition #6 | 00 | 00 |
| Partition #7 | 00 | FF |
| Partition #8 | 00 | 00 |

Hex format

Post Decryption: Partitioned Data, Reverse Transformed, Padding Removed Illustration Partitioned:

|  | Byte #1 | Byte #2 |
|---|---|---|
| Partition #1 | 00 | 55 |
| Partition #2 | 00 | 66 |
| Partition #3 | 00 | 78 |
| Partition #4 | 01 | 80 |
| Partition #5 | 00 | 00 |
| Partition #6 | 00 | 00 |
| Partition #7 | 00 | FF |
| Partition #8 | 00 | 00 |

Hex format

301

Reverse Transformed:

| Byte # | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Hex | 08 | 00 | 00 | 00 | 00 | 00 | 00 | 00 | 41 | 42 | 43 | 44 | 45 | 46 | 47 | 48 |

302

Padding Removed:

| Byte # | 1 | 2 | 3 | 4 | 5 | 6 | 7 | 8 |
|---|---|---|---|---|---|---|---|---|
| Bytes | 01000001 | 01000010 | 01000011 | 01000100 | 01000101 | 01000110 | 01000111 | 01001000 |
| Hex format | 41 | 42 | 43 | 44 | 45 | 46 | 47 | 48 |

↑ Most significant bit in byte

Data Padding Divisor Illustration

| Encryption | Cipher(-Mode) | Category | Block Size (bits) | Uses Padding | Data Padding Divisor "DPD" |
|---|---|---|---|---|---|
| Asymmetric | RSA[1] | block | variable | yes | 8 |
| Symmetric | AES-CCM | block | 128 | no | 8 |
| Symmetric | AES-GCM | block | 128 | no | 8 |
| Symmetric | ChaCha20 | stream | 512 | no | 8 |
| Symmetric | 3DES-CBC | block | 64 | yes or no | 64 |
| Symmetric | 3DES-CFB | block | 64 | yes or no | 64 |
| Symmetric | AES-CBC | block | 128 | yes or no | 128 |
| Symmetric | AES-CFB | block | 128 | yes or no | 128 |

401 / 402 / 403 / 404 / 405 / 406

[1]RSA refers to secure RSA implementations that use padding.

Figure 4

Highest Data Padding Divisor Illustration

| Cipher(-Mode) Partition 1…Cipher(-Mode) Partition 8 | Highest Data Padding Divisor ("HDPD") |
|---|---|
| RSA; RSA; RSA; RSA; RSA; RSA; RSA; RSA | 8 |
| AES-CCM; AES-CCM; AES-CCM; AES-CCM; AES-CCM; AES-CCM; AES-CCM; AES-CCM | 8 |
| AES-GCM; AES-GCM; AES-GCM; AES-GCM; AES-GCM; AES-GCM; AES-GCM; AES-GCM | 8 |
| ChaCha20; ChaCha20; ChaCha20; ChaCha20; ChaCha20; ChaCha20; ChaCha20; ChaCha20 | 8 |
| 3DES-CBC; 3DES-CBC; 3DES-CBC; 3DES-CBC; 3DES-CBC; 3DES-CBC; 3DES-CBC; 3DES-CBC | 64 |
| 3DES-CFB; 3DES-CFB; 3DES-CFB; 3DES-CFB; 3DES-CFB; 3DES-CFB; 3DES-CFB; 3DES-CFB | 64 |
| AES-CBC; AES-CBC; AES-CBC; AES-CBC; AES-CBC; AES-CBC; AES-CBC; AES-CBC | 128 |
| AES-CFB; AES-CFB; AES-CFB; AES-CFB; AES-CFB; AES-CFB; AES-CFB; AES-CFB | 128 |
| AES-CCM; AES-GCM; ChaCha20; AES-CCM; AES-CCM; AES-GCM; ChaCha20; AES-CCM | 8 |
| AES-GCM; 3DES-CBC; AES-CCM; 3DES-CFB; AES-CCM; 3DES-CBC; AES-GCM; 3DES-CBC | 64 |
| AES-CCM; AES-GCM; ChaCha20; AES-GCM; 3DES-CBC; AES-CFB; 3DES-CFB; AES-CBC | 128 |

GEE Limitations Illustration

| 601 Key-based Algorithms | 602 Number of partitions | 603 Cipher(-Mode) for each partition | 604 Key value for each partition | 605 Key size for each partition | 606 Padding type for each partition |
|---|---|---|---|---|---|
| Asymmetric | 8 | different or same as another partition | different or same as another partition | different or same as another partition | different or same as another partition |
| Symmetric | 8 | different or same as another partition | different or same as another partition | different or same as another partition | different or same as another partition |

| 607 Key-based Algorithms | 608 Cipher |
|---|---|
| Asymmetric | ciphertext length equals key length |
| Symmetric | block or stream |

Figure 6

Asymmetric Encryption Enhancement Illustration

Current Encryption

| Example | Cipher-Key Size-Padding Type | Security Level Bits ("b") | Max Operations to Break Encryption $2^b$ | Maximum Message Size (bytes) |
|---|---|---|---|---|
| 1 | RSA-1024-PKCS#1 | 79 | $2^{79} \sim 6.04$ E+23 | 117 |
| 2 | RSA-1024-OAEP w/ SHA-1 | 79 | $2^{79} \sim 6.04$ E+23 | 86 |
| 3 | RSA-1024-OAEP w/ SHA-256 | 79 | $2^{79} \sim 6.04$ E+23 | 62 |
| 4 | RSA-1024-OAEP w/ SHA-384 | 79 | $2^{79} \sim 6.04$ E+23 | 30 |
| 5 | RSA-1024-OAEP w/ SHA-512 | 79 | $2^{79} \sim 6.04$ E+23 | 0 |

General Encryption Enhancement

| Example | Super Key First Partition Cipher-Key Size (bits)-Padding Type... Eighth Partition Cipher-Key Size-Padding Type | Security Level Bits ("b") | Max Operations to Break Encryption $2^b$ | Maximum Message Size (bytes) |
|---|---|---|---|---|
| 1 | RSA-1024-PKCS#1...RSA-1024-PKCS#1 | 201 | $2^{201} \sim 3.21$ E+60 | 935 |
| 2 | RSA-1024-OAEP w/ SHA-1...RSA-1024-OAEP w/ SHA-1 | 201 | $2^{201} \sim 3.21$ E+60 | 687 |
| 3 | RSA-1024-OAEP w/ SHA-256...RSA-1024-OAEP w/ SHA-256 | 201 | $2^{201} \sim 3.21$ E+60 | 495 |
| 4 | RSA-1024-OAEP w/ SHA-384...RSA-1024-OAEP w/ SHA-384 | 201 | $2^{201} \sim 3.21$ E+60 | 239 |
| 5 | RSA-1024-OAEP w/ SHA-512...RSA-1024-OAEP w/ SHA-512 | 201 | $2^{201} \sim 3.21$ E+60 | 0 |
| 6 | RSA-3904-OAEP w/SHA-256; RSA-1728-OAEP w/SHA-256; RSA-2240-OAEP w/SHA-256; RSA-1536-OAEP w/SHA-256; RSA-3968-OAEP w/SHA-256; RSA-3840-OAEP w/SHA-256; RSA-2752-OAEP w/SHA-256; RSA-2304-OAEP w/SHA-256 | 306 | $2^{306} \sim 1.30$ E+92 | 1007 |

Figure 7

Symmetric Encryption Enhancement Illustration

Current Encryption

| Example | Cipher-Key Size (bits) | Security Level Bits ("b") | Max Operations to Break Encryption $2^b$ |
|---|---|---|---|
| 1 | AES-128 | 128 | $2^{128} \sim 3.40\ E+38$ |
| 2 | AES-192 | 192 | $2^{192} \sim 6.27\ E+57$ |
| 3 | AES-256 | 256 | $2^{256} \sim 1.15\ E+77$ |
| 4 | ChaCha20-256 | 256 | $2^{256} \sim 1.15\ E+77$ |
| 5 | 3DES-128 | 112 | $2^{112} \sim 5.19\ E+33$ |
| 6 | 3DES-192 | 168 | $2^{168} \sim 3.74\ E+50$ |

General Encryption Enhancement

| Example | Super Key<br>First Cipher-Key Size (bits)...Eighth Cipher-Key Size | Security Level Bits ("b") | Max Operations to Break Encryption $2^b$ |
|---|---|---|---|
| 1 | AES-128; AES-128; AES-128; AES-128; AES-128; AES-128; AES-128; AES-128 | 1024 | $2^{1024} \sim 1.79\ E+308$ |
| 2 | AES-192; AES-192; AES-192; AES-192; AES-192; AES-192; AES-192; AES-192 | 1536 | $2^{1536} \sim 2.41\ E+462$ |
| 3 | AES-256; AES-256; AES-256; AES-256; AES-256; AES-256; AES-256; AES-256 | 2048 | $2^{2048} \sim 3.23\ E+616$ |
| 4 | ChaCha20-256; ChaCha20-256; ChaCha20-256; ChaCha20-256; ChaCha20-256; ChaCha20-256; ChaCha20-256; ChaCha20-256 | 2048 | $2^{2048} \sim 3.23\ E+616$ |
| 5 | 3DES-128; 3DES-128; 3DES-128; 3DES-128; 3DES-128; 3DES-128; 3DES-128; 3DES-128 | 896 | $2^{896} \sim 5.28\ E+269$ |
| 6 | 3DES-192; 3DES-192; 3DES-192; 3DES-192; 3DES-192; 3DES-192; 3DES-192; 3DES-192 | 1344 | $2^{1344} \sim 3.83\ E+404$ |
| 7 | AES-256; ChaCha20-256; AES-256; AES-256; AES-256; ChaCha20-256; 3DES-128; 3DES-192 | 1816 | $2^{1816} \sim 4.68\ E+546$ |

Figure 8

Transform

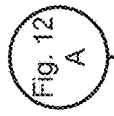

1301 — Copy the first bit of each of the eight bytes to form a new byte and add it to partition zero at byte index—$partition_0$(byte index)

1302 — Copy the second bit of each of the eight bytes to form a new byte and add it to partition one at byte index—$partition_1$(byte index)

1303 — Copy the third bit of each of the eight bytes to form a new byte and add it to partition two at byte index—$partition_2$(byte index)

1304 — Copy the fourth bit of each of the eight bytes to form a new byte and add it to partition three at byte index—$partition_3$(byte index)

1305 — Copy the fifth bit of each of the eight bytes to form a new byte and add it to partition four at byte index—$partition_4$(byte index)

1306 — Copy the sixth bit of each of the eight bytes to form a new byte and add it to partition five at byte index—$partition_5$(byte index)

1307 — Copy the seventh bit of each of the eight bytes to form a new byte and add it to partition six at byte index—$partition_6$(byte index)

1308 — Copy the eighth bit of each of the eight bytes to form a new byte and add it to partition seven at byte index—$partition_7$(byte index)

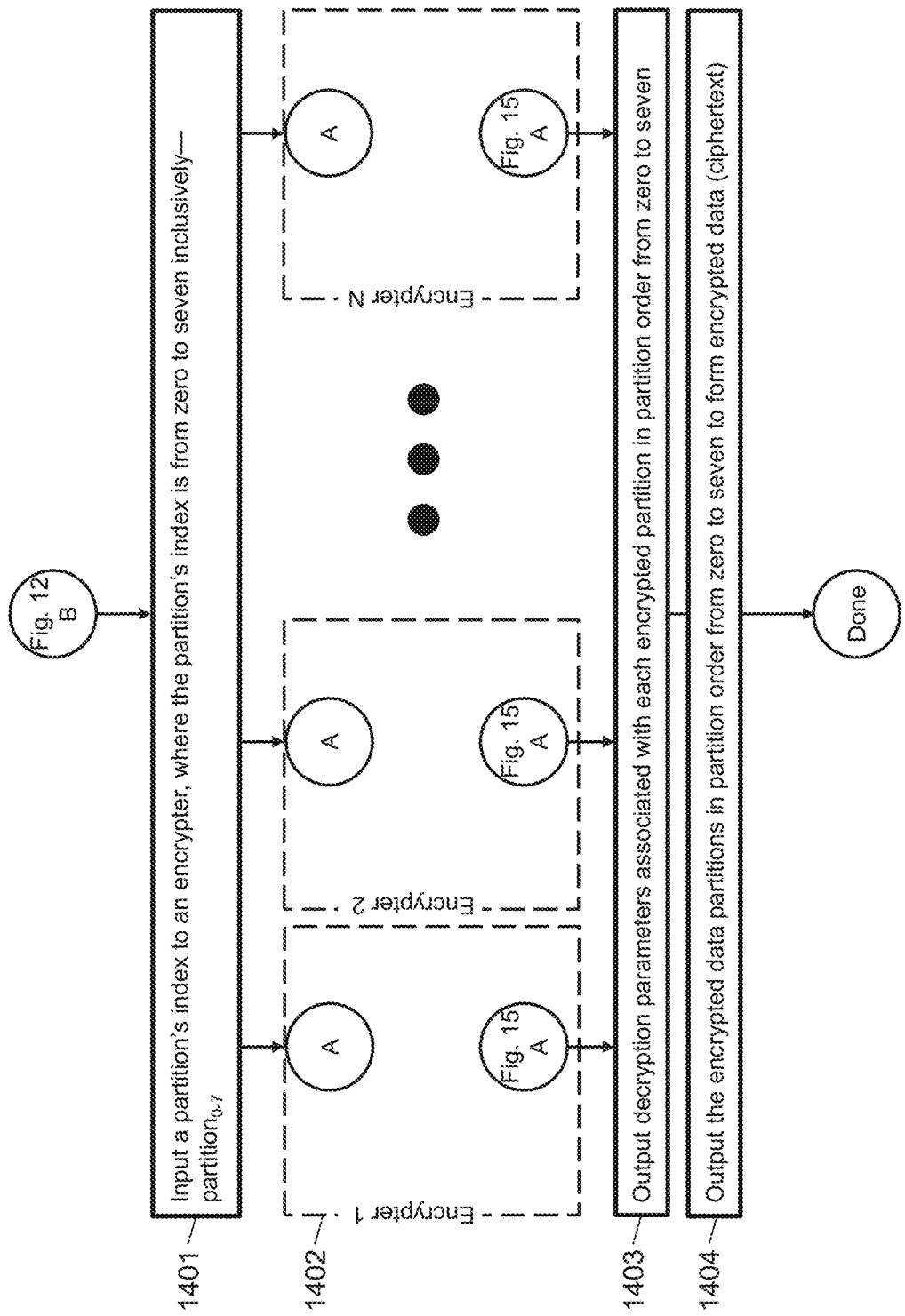

Reverse Transform

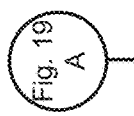
(Fig. 19 A)

2001 — Copy the first bit of each of the eight bytes in sequential order to form a new byte and add the new byte to a zero-based indexed array at the array index equal to the byte index multiplied by eight 2002 — Copy the second bit of each of the eight bytes in sequential order to form a new byte and add the new byte to the array at the array index equal to the byte index multiplied by eight, plus one 2003 — Copy the third bit of each of the eight bytes in sequential order to form a new byte and add the new byte to the array at the array index equal to the byte index multiplied by eight, plus two 2004 — Copy the fourth bit of each of the eight bytes in sequential order to form a new byte and add the new byte to the array at the array index equal to the byte index multiplied by eight, plus three 2005 — Copy the fifth bit of each of the eight bytes in sequential order to form a new byte and add the new byte to the array at the array index equal to the byte index multiplied by eight, plus four 2006 — Copy the sixth bit of each of the eight bytes in sequential order to form a new byte and add the new byte to the array at the array index equal to the byte index multiplied by eight, plus five 2007 — Copy the seventh bit of each of the eight bytes in sequential order to form a new byte and add the new byte to the array at the array index equal to the byte index multiplied by eight, plus six 2008 — Copy the eighth bit of each of the eight bytes in sequential order to form a new byte and add the new byte to the array at the array index equal to the byte index multiplied by eight, plus seven

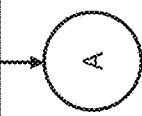
A

Figure 20

DIGITAL SIGNATURE ENHANCEMENT

The current application claims priority as a continuation of U.S. application Ser. No. 17/721,426, filed on Apr. 15, 2022, presently pending. The contents of the application are hereby incorporated by reference.

FIELD OF THE INVENTION

This invention, General Encryption Enhancement, hereinafter referred to as "GEE," relates to
(i) the operation of key-based asymmetric and symmetric data encryption applications;
(ii) improving computer capabilities to encrypt data at a higher security level than an underlying encryption primitive used by the computer would provide;
(iii) substantially increasing data protection through the use of multiple cryptography ciphers and/or multiple encryption keys while encrypting each bit of plaintext bytes only once;
(iv) increasing the data length that may be encrypted with asymmetric encryption;
(v) transforming plaintext so that all bits in common bit positions of plaintext bytes may be encrypted independently; and
(vi) exploiting available computer parallelism during data transformation, encryption, decryption, and reverse transformation.

BACKGROUND

Data encryption is ubiquitous in our daily lives and automatic where its use is implied and/or expected. In a minority of use cases, an end-user explicitly chooses to encrypt particular data, such as encrypting an email. Even then, the end-user has little/no control over the encryption process. There are use cases where the initial setup enables autonomous data encryption. An administrator of a computer may enable disk encryption, where, according to Wikipedia, "[d]isk encryption uses disk encryption software or hardware to encrypt every bit of data that goes on a disk or disk volume." In the process of enabling disk encryption, an administrator is asked to provide configuration information one time, such as a password or security card to unlock the drive, where to save the recovery key, and how much of the drive to encrypt. After this initial setup, data encryption is autonomous. Likewise, home security systems require device installation and initial setup, which may include devices such as a: base station, keypad, range extender, video security camera, video doorbell, motion sensor, glass break sensor, and/or contact sensor. If the administrator of the home security system enables encryption, then the system becomes more secure by encrypting data communication from devices such as a video security camera or video doorbell autonomously. Other use cases require no end-user setup, but encryption use is implied and automatic. When an end-user selects a web hyperlink from their tablet interface, where the link starts with https, the data communication between their tablet and the website is automatically encrypted. Even if the link started with http, a website or client software may automatically redirect the link to https to ensure secure communications. Popular website browsers may even balk at a user trying to connect to a website insecurely through http and put up a blocker screen where the end-user must accept the risk of an unsecured connection to continue. Another area where end-users are using encryption behind the scenes in an autonomous fashion is digital signatures. According to Wikipedia, "[a] digital signature is a mathematical scheme for verifying the authenticity of digital messages or documents." The data itself-a digital message or document—is not encrypted to generate a digital signature. A digital signature algorithm creates a hash of the data to be signed using a hash algorithm, which is then encrypted using a signer's private encryption key. The encrypted hash is the digital signature. To verify a digital signature, the original data, hash algorithm, digital signature algorithm, and signer's public encryption key must be known/available. End-users of digital signature services, such as those provided by DocuSign, are shielded from the implementation and may not even be aware of encryption in the process. Perhaps the most pronounced use of autonomous encryption is watching paid-for television. Paid-for television content, however delivered, including cable, satellite, or streaming services, is most likely encrypted and then later decrypted at the viewer's end device, computer, or cable box. There is no choice by the end-user regarding content encryption, but the user is in effect using encryption by using the television service. In summary, device manufacturers, service providers, website administrators, application providers, and content providers implement data and/or data hash encryption to provide data confidentiality, data integrity assurances, authentication of communicating entities, and/or non-repudiation. On the other hand, end-users use encryption with little/no knowledge of how encryption is implemented or initiated.

Digital data may be operated on by cryptography ciphers for the purpose of encryption and decryption. Asymmetric encryption algorithms, such as RSA ("Rivest-Shamir-Adleman"), use two different keys: a public key that is generally available and a private key that is kept secret. Data is encrypted by the sender using the receiver's public key, and the encrypted data exchanged with the receiver is decrypted by the receiver using the receiver's private key. Symmetric encryption algorithms, such as the Advanced Encryption Standard ("AES") and the Triple Data Encryption Standard ("3DES") algorithms use a single key input to the cipher. When the 3DES-3 key cipher is presented with a 192-bit key, it uses 168 bits for encryption. The AES cipher, on the other hand, when presented with a 128/256 bit key uses 128/256 bits for encryption. Data is encrypted by the sender using the key, and both the encrypted data and key must be available to the receiver for decryption. Cascade or multiple encryption, encrypts data multiple times to achieve higher data protection and may use multiple ciphers and/or multiple encryption keys. This means that cascade encryption serially operates on data multiple times, uses additional computer resources, and takes more processing time compared to encryption operating on data only one time.

Encryption security may be associated with a cipher, its key size, and an attacker's capabilities. The National Institute of Standards and Technology ("NIST") in its publication NIST Special Publication 800-57 Part 1 Revision 5, "Recommendation for Key Management," page 53, points out, "[t]he attacker's capabilities could include the cryptanalysis techniques used to reduce the time to attack an algorithm, the processing power available to the attacker, and the advent of new types of computing systems (e.g., quantum computers)" and on page 59, "[o]ver time, cryptographic algorithms and their associated key lengths may become more vulnerable to successful attacks, requiring a transition to stronger algorithms or longer key lengths." There are serious implications for data encrypted with a cipher that has become vulnerable to attack, as per page 62-63 states, "[f]or example, the algorithm or key length used may no longer offer adequate security because of improvements in computational capability or cryptanalysis. In this case, applying protection to "new" information can be performed using stronger algorithms or keys. However, information that was previously protected using these now-inadequate algorithms and keys may no longer be secure. This information may include other keys or sensitive information protected by the keys." There are concerns that quantum computing may provide the computer power to break ciphers with a given key length that are considered safe today. The NIST publication NISTIR 8105, "Report on Post-Quantum Cryptography," Table 1, indicates that algorithms such as RSA will not be secure in the face of large-scale quantum computers, and AES encryption will need larger key sizes to remain secure.

A new solution is needed to break this data at-risk cycle and future-proof data encryption. Encrypting data using the new solution would keep data secure over time even though attacker's capabilities increase and quantum computers become mainstream. This is possible if the process of encrypting data one time used multiple ciphers and a much longer key. Multiple ciphers would protect against vulnerabilities found in any one of the ciphers. A longer key length would make the number of permutations faced by an attacker to break such encryption impossible, even with large scale quantum computers.

The new solution will have a similar performance to today's single cipher-key encryption, considering that each bit of data is encrypted only one time and by taking advantage of parallelism provided by current computers. The new solution will not require modifications to the encryption algorithms themselves.

The measure of strength that an encryption cipher achieves encrypting data is its security level and depends on the key size used with a cipher. The security level is expressed in bits; for asymmetric encryption ciphers, it is calculated per the formula provided in the NIST publication, "Implementation Guidance for FIPS 140-2 and the Cryptographic Module Validation Program" page 122; and for symmetric encryption ciphers, it's the number of bits actually used by a cipher from its encryption key. The security level is related directly to the maximum number of operations necessary to break encryption by uncovering the encryption key used to encrypt data. The number two raised to the power of the number of security level bits is equal to such maximum number of operations to break encryption. This means that a security level of 110 bits compared to 79 bits requires up to 1.29 E+33 more operations to break encryption, as $2^{110}-2^{79}=1.29$ E+33. The new solution uses a "Super Key", which is a concatenation of eight encryption keys. The Super Key has the effect of raising the security level for a given cipher-key size to the equivalent of eight times the key size.

A 3DES cipher with a 128-bit key has a security level of 112 bits; an AES cipher with a 128-bit key has a security level of 128 bits; and an RSA cipher with a 2880 bit key has a security level of 128 bits. The new solution, by comparison, using eight (i) 3DES ciphers with different 128-bit keys would raise the security level to 896 bits; (ii) AES ciphers with different 128-bit keys would raise the security level to 1024 bits; and (iii) RSA ciphers with different 2880 bit keys, would raise the security level to 310 bits.

Today's encryption takes in plaintext and produces ciphertext. The new solution transforms and partitions plaintext so that the bits corresponding to each bit position of all plaintext bytes are grouped in separate partitions. This means that there are always eight partitions, and each partition holds one-eighth of the input. As there are eight bits in a byte of plaintext, the bits from position one of all plaintext bytes reside in the first partition, the bits from position two of all plaintext bytes reside in the second partition, the bits from position three of all plaintext bytes reside in the third partition, the bits from position four of all plaintext bytes reside in the fourth partition, the bits from position five of all plaintext bytes reside in the fifth partition, the bits from position six of all plaintext bytes reside in the sixth partition, the bits from position seven of all plaintext bytes reside in the seventh partition, and the bits from position eight of all plaintext bytes reside in the eighth partition. Independent encryption of each partition with its own cipher and/or key has a decided advantage. Even though each bit of plaintext is encrypted only once, like today's single cipher-key encryption, each byte of plaintext encrypted with the new solution has eight ciphers and keys associated with it. To decrypt any byte of plaintext, all eight ciphers and their keys must be known. Even if the same cipher was used to encrypt each partition, eight keys are still required. If an AES cipher with a different 256-bit key was used to encrypt each of the eight partitions, the security level would be 2048 bits. This means that the number of operations to break the encryption has risen from $2^{256}$ or 1.15 E+77 using today's single AES cipher with a 256-bit key, to $2^{2048}$, which is 3.23 E+616—an astronomical level of difficulty.

BRIEF DESCRIPTION OF THE DRAWINGS

The present invention is described with respect to particular exemplary embodiments thereof, and reference is accordingly made to the drawings in which:

FIG. 2 shows an illustration of eight data bytes being padded, transformed, and partitioned before encryption.

FIG. 3 shows an illustration of partitioned data bytes after decryption, reverse transformed, and padding removed.

FIG. 4 shows an illustration of the data padding divisor for various asymmetric and symmetric ciphers and some of the characteristics of each cipher.

FIG. 5 shows an illustration of the highest data padding divisor for groups of eight asymmetric or symmetric ciphers, where each cipher in each group has been assigned to a partition.

FIG. 6 shows an illustration of GEE limitations, where GEE requires (i) key-based asymmetric or symmetric cipher algorithms; (ii) eight partitions; (iii) the cipher, key value, key size, and padding type associated with encrypting/decrypting each partition are different or the same as another partition; (iv) asymmetric ciphers that produce ciphertext whose length is equal to the cipher's key length; and (v) symmetric ciphers that are block or stream ciphers.

FIG. 7 shows an illustration of the security level (measured in bits), maximum operations to break encryption, and maximum message size achieved by an RSA asymmetric encryption cipher using a 1024 bit key size and various padding types compared to the security level, maximum operations to break encryption, and maximum message size achieved by GEE using the same RSA cipher, key size and padding type for each partition and an example of GEE using the RSA cipher, various key sizes and OAEP w/SHA-256 padding type for the partitions.

FIG. 8 shows an illustration of the security level (measured in bits) and maximum operations to break encryption achieved by various symmetric encryption ciphers and key sizes compared to the security level bits and maximum operations to break encryption achieved by GEE using the same cipher and key size for each partition and an example of GEE using various ciphers and key sizes for the partitions.

FIG. 13 shows a continuation of the flowchart depicted in FIG. 12 designation A and transforming eight padded data bytes into eight new bytes with each new byte added to a separate partition, where each partition holds the bits from a common bit position in padded data bytes with a continuation on FIG. 12.

FIG. 14 shows a continuation of the flowchart depicted in FIG. 12 designation B and the parallelized operation of inputting a partition's index to an encrypter, where the partition's index is from zero to seven inclusively with a continuation on FIG. 15 and continuations from the flowchart depicted in FIG. 15 designation A, and outputting the (i) decryption parameters associated with each encrypted partition in partition order from zero to seven; and (ii) encrypted data partitions in partition order from zero to seven to form encrypted data (ciphertext) and the GEE encryption process is done.

FIG. 20 shows a continuation of the flowchart depicted in FIG. 19 designation A and reverse transforming eight bytes, such that the bits from each of the common bit positions of the eight bytes form eight new bytes that are added sequentially to a zero-based indexed array starting at the array index that is equal to the byte index multiplied by eight with a continuation on FIG. 19.

DETAILED DESCRIPTION

Summary of Notations and Nomenclature

Figure 1:
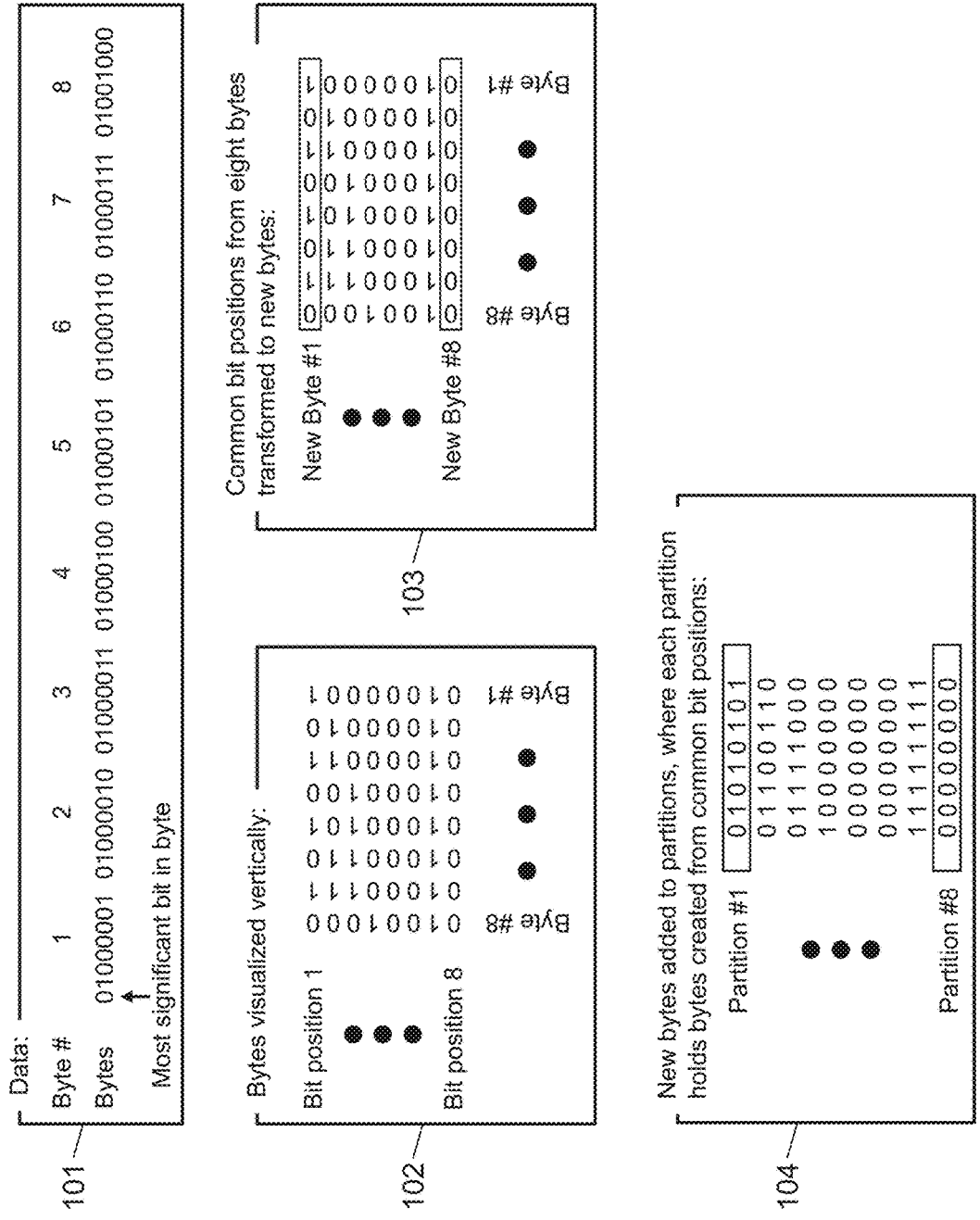
FIG. 1 shows an illustration of eight data bytes being transformed and partitioned by collecting the data bits from common bit positions in the eight data bytes to form eight new bytes and adding each new byte to a separate partition.

Byte/byte-means a unit of digital information that consists of eight bits.

Key—is a sequence of digital bits that is an input to a Cipher.

Cipher-means a Key-based algorithm that performs encryption and decryption.

Mode-means a Symmetric Encryption block Cipher mode of operation.

AES in cryptography is the Advanced Encryption Standard that is a Symmetric Encryption algorithm.

DES—in cryptography is the Data Encryption Standard that is a Symmetric Encryption block algorithm.

DES—in cryptography is the Triple Data Encryption Standard algorithm, where the DES algorithm is applied three times to each Data block.

CCM—in cryptography is counter with cipher block chaining message authentication code Mode and never pads its input.

GCM—in cryptography is Galois/Counter Mode and never pads its input.

CBC—in cryptography is cipher block chaining Mode.

CFB—in cryptography is cipher feedback Mode.

ChaCha20-in cryptography is a Symmetric Encryption stream algorithm developed by Daniel J. Bernstein.

Serpent—in cryptography is a Symmetric Encryption block algorithm that was designed by Ross Anderson, Eli Biham, and Lars Knudsen.

Twofish—in cryptography is a Symmetric Encryption block algorithm that was designed by Bruce Schneier, John Kelsey, Doug Whiting, David Wagner, Chris Hall, and Niels Ferguson.

RSA—in cryptography is an Asymmetric Encryption algorithm described by Ron Rivest, Adi Shamir, and Leonard Adleman; and for the purposes considered herein, the implementations of RSA include padding.

Data—is a sequence of one or more bytes.

PKCS #1-in cryptography is the padding associated with the Public-Key Cryptography Standards.

SHA—in cryptography means Secure Hash Algorithms developed by NIST that are a family of cryptographic hash functions.

OAEP with SHA-1/256/384/512-in cryptography is Optimal Asymmetric Encryption Padding standard with a SHA-1/256/384/512 hash algorithm.

Plaintext—in cryptography is Data that is not encrypted.

Ciphertext—in cryptography is Data that has been encrypted.

Objectives-means Data confidentiality, Data integrity, authentication of communicating entities, and/or non-repudiation.

Encryption Parameters or $E_{partition\ index}$ are those input parameters, including a Cipher and Key, to an encrypter that enable the encrypter to perform its task, which varies depending on Objectives.

Decryption Parameters or $D_{partition\ index}$—are those input parameters, including a Cipher and Key, to a decrypter that enable the decrypter to perform its task, which may include particular parameters generated or used by an encrypter during encryption.

Super Key-a concatenation of eight Keys.

Asymmetric Encryption-means a type of digital Data encryption that uses a pair of mathematically related Keys, a public Key and a private Key, where input Data that has been encrypted using the public Key can only be decrypted using the related private Key; and the Ciphertext length is equal to the Key length.

Symmetric Encryption-means a type of digital Data encryption that uses a block or stream Cipher with the same Key to encrypt and decrypt Data.

Cascade/Multiple Encryption-means encrypting Data multiple times to achieve higher Data protection and may use multiple ciphers and/or multiple encryption keys.

NIST-means National Institute of Standards and Technology.

Security Level-means a measure of the strength that a Cipher achieves expressed in bits. For Asymmetric Encryption Ciphers it is calculated per the formula provided in NIST publication, "Implementation Guidance for FIPS 140-2 and the Cryptographic Module Validation Program," last updated Nov. 5, 2021, page 122, and for Symmetric Encryption Ciphers it is the number of bits actually used by a Cipher from its encryption Key for encryption.

DPD-means Data padding divisor which is (i) eight for Asymmetric Encryption Ciphers, Symmetric Encryption stream Ciphers, and Symmetric Encryption Cipher-Modes where Data padding is not an option and never pad their input; and (ii) the Cipher's block size measured in bits for Symmetric Encryption Cipher-Modes where Data padding is an option.

HDPD-means the highest DPD from a group of eight Ciphers.

DSA-means Digital Signature Algorithm that is an algorithm or combination of algorithms, which is governed by Digital Signature Parameters, that creates and/or verifies a Digital Signature.

Digital Signature Parameters or $P_{partition\ index}$—are those DSA parameters that enable the DSA to perform its task.

Digital Signature or $S_{partition\ index}$-means the encrypted hash of Data, which is created by a DSA.

FIPS-means Federal Information Processing Standards.

The current/prior art for encryption security level enhancements typically falls into requiring/using larger key sizes for existing ciphers, cascading ciphers, and new ciphers.

Requiring longer key lengths is the standard approach to increasing encryption security levels. But there are limits on the size of the keys, due to either the cipher architecture or the time it takes to generate large key sizes. The popular AES cipher only supports 128/192/256-bit keys. There is not an upgrade path to go beyond a 256-bit security level (256-bit key size). The RSA cipher, by comparison, supports a larger range of keys, but larger keys take a longer time to generate and RSA can only encrypt small amounts of Data. If the goal was to upgrade from an RSA security level of 79 bits (1024 bit key size) to a security level of 269 bits (16,384-bit key size) to ensure security for the long term, it would take 1,000s of times longer to generate a 16,384 bit key compared to a 1,024-bit key.

The GEE invention takes a Super Key approach, where a Super Key is eight times longer than an asymmetric/symmetric encryption key and formed from the concatenation of eight individual asymmetric/symmetric encryption keys. The resulting encryption security level is dramatically raised, even though the current art encryption algorithm is utilized. This means that today's AES encryption with a 256-bit key and 256-bit security level, would be raised effectively by GEE to AES encryption with a 2048 bit key and 2048 bit security level. RSA encryption with a 2048-bit key and 110-bit security level, would be raised effectively by GEE to RSA encryption with a 16,384-bit key and 269-bit security level. The Super Key approach future-proofs encryption against major technology developments, such as quantum computing, as the security level and the corresponding number of operations to break the encryption are exceedingly high. GEE with AES ciphers and a 2048 bit Super Key would require up to 3.23 E+616 operations to break encryption, and GEE with RSA ciphers and a 16,384-bit Super Key would require up to 9.48 E+80 operations to break encryption.

Current/prior art for encryption may also use cascading ciphers to enlarge the keyspace and provide protection against a cipher in the cascade being broken. Encryption software, like VeraCrypt, offers encryption with two and three cipher cascades, such as AES-Twofish-Serpent for a three cipher cascade. Ciphers like the 3DES-3 key cipher have an internal triple cascade of DES ciphers and partition the input key to three smaller keys of equal length. A 3DES-3 key cipher presented with a 192-bit key is divided into three 64 bit keys. Each 64-bit key is applied to its own DES cipher. Each DES cipher uses 56 of 64 key bits for encryption. Cascade ciphers have the downside of processing Data more than once, as the output of one cipher feeds the next cipher in the cascade. Therefore, for a two/three cipher cascade, the input Data is processed two/three times. Cascade encryption processing time puts a hard limit on how long a cascade can reasonably be and therefore limits the security level that can be achieved.

GEE's innovation is that, in one embodiment, it operates on each bit of Data only one time, unlike prior art approaches such as cascade encryption. GEE's partitioning process creates eight partitions, each holding one-eighth of the transformed Data. In this way, the embodiment of the invention relates to data in a specific order and relates to data in specific physical locations in computer memory. These partitions can be encrypted in parallel, each with a different key and/or cipher. Where typical cascade encryption May use two or three ciphers, GEE can use up to eight ciphers. This offers protection against ciphers being broken and a much higher security level than cascade encryption.

New encryption algorithms are being developed for the post-quantum cryptography era. 27 To embrace these new algorithms and revamp the encryption space will be no small undertaking in terms of time, cost, and resources. But there hasn't been a choice to use current, well-established, FIPS compliant encryption algorithms to achieve the security level necessary to protect Data when quantum computers are mainstream.

GEE is a practical invention that doesn't require new encryption algorithms or any modifications to well-established, FIPS-compliant encryption algorithms. GEE can use current encryption algorithms, asymmetric or symmetric, to provide the security level necessary to protect Data in a post-quantum cryptography era.

Current/prior art encryption algorithms operate on Data in a serial manner at the bit/byte/byte block level. These algorithms don't consider operating on the eight bit positions in each Data byte separately and independently and encrypting the bits in each bit position with a different key. This means these algorithms don't process all bit position one bits together, all bit position two bits together . . . all bit position eight bits together. By not considering bit positions, a significant opportunity is lost to raise the encrypted Data output security level. The missed opportunity is that each bit position in all Data bytes would rely on a different key and require eight keys for decryption.

GEE transforms Data before encryption so that each bit position in all Data bytes is encrypted independently with a key and cipher. This results in each byte of Data requiring eight encryption keys for decryption, therefore significantly enlarging the keyspace and corresponding security level.

Data, in general, is organized as a collection of bytes and transferred as a serial stream of bytes. Sometimes Data is segmented into several streams of Data for transport to be later reconstituted, such as with a file-sharing application. Data can also be reorganized, modified, augmented, and formatted to allow it to be used by more than one discipline, such as files that have been formatted to an Intermediate Data Format to allow Data to be used by both electronic design automation software and solid modeling software. Portions of data may also be changed, such as an audio application that removes humming from an audio file or an image application that re-colorizes an image.

The GEE Data transformation, by comparison, does not segment, organize, augment, modify, format, and/or change portions of input Data bytes. GEE creates new Data bytes, eight at a time, derived from a stream of input Data bytes, where each of the eight new Data bytes is added to a separate partition. The result is eight partitions of new Data bytes.

GEE provides mechanisms to:
(i) pad Plaintext bytes;
(ii) parallelly transform and partition padded Plaintext bytes into eight partitions of transformed bytes;
(iii) parallelly perform independent Asymmetric Encryption or Symmetric Encryption on eight partitions of transformed bytes using each partition's associated encryption parameters;
(iv) combine encrypted output from eight independent encryptions to form Ciphertext;
(v) partition Ciphertext into eight partitions considering the decryption parameters associated with the Ciphertext;
(vi) parallelly perform eight independent decryptions, with each decryption being performed on a partition of the Ciphertext using the partition's decryption parameters;
(vii) reverse transform the decrypted output from eight independent decryptions to form padded Plaintext;
(viii) remove the padding from padded Plaintext to form Plaintext;
(ix) increase the Security Level for Asymmetric Encryption or Symmetric Encryption from the Security Level associated with a single Key to eight Keys, provided each Key value is different while encrypting each bit of Plaintext only once;
(x) increase the maximum Plaintext size ("M") measured in bytes for Asymmetric Encryption using a given Cipher, Key, and padding from M to eight times M, minus 1, ["(8M)−1"], while encrypting each bit of Plaintext bytes only once.

GEE encrypts each bit of Plaintext one time. GEE utilizes eight generally available Asymmetric Encryption or Symmetric Encryption Ciphers without any Cipher or Objective modification. The invention pads Plaintext, and the padded Plaintext is transformed eight bytes at a time, taking the bits in common bit positions to create eight new transformed bytes, where each transformed byte is added successively to one of eight partitions. After all padded Plaintext bytes are transformed, the first partition holds the bits from the first bit position of padded Plaintext bytes; the second partition holds the bits from the second bit position of padded Plaintext bytes; the third partition holds the bits from the third bit position of padded Plaintext bytes; the fourth partition holds the bits from the fourth bit position of padded Plaintext bytes; the fifth partition holds the bits from the fifth bit position of padded Plaintext bytes; the sixth partition holds the bits from the sixth bit position of padded Plaintext bytes; the seventh partition holds the bits from the seventh bit position of padded Plaintext bytes; and the eighth partition holds the bits from the eighth bit position of padded Plaintext bytes. After Encryption Parameters are provided for each of the eight partitions, where each partition holds one-eighth of the transformed bytes, each partition is independently encrypted in parallel to the extent permitted by the underlying hardware. The eight encrypted partitions are combined sequentially from partitions one to eight to form Ciphertext.

If GEE used the same Key to encrypt all eight partitions, then no additional Data protection will be achieved over today's single Key encryption. However, if different Keys are used with GEE to encrypt some or all of the eight partitions, then a much higher degree of Data protection will be achieved.

If a vulnerability is discovered in a Cipher, then past or future use of the Cipher creates the risk of encrypted Data being exposed. GEE encryption, on the other hand utilizing two to eight Ciphers mitigates the risk of a Cipher being broken, as all Ciphers utilized would need to be broken to create a similar level of risk.

Unlike single Cipher and Key encryption or Cascade Encryption, GEE can encrypt each common bit position of input Data bytes using a different Cipher and/or different Key. This means that to recover any or all Plaintext bytes requires up to eight different Ciphers and/or up to eight different Keys.

This invention decrypts Ciphertext by first sequentially partitioning Ciphertext into eight encrypted partitions, considering appropriate decryption parameters. Each of the eight encrypted partitions is independently decrypted using the Decryption Parameters associated with the encrypted partition to form eight decrypted partitions. The bytes in the decrypted partitions are reverse transformed to create padded Plaintext. For the number of times that is the byte length of a single partition, this reverse transformation is accomplished by (i) taking eight bytes at a time ("group"), one byte from each partition in partition order, the first partition to the eighth partition, and at the same zero-based byte index ("index") within each partition; (ii) taking the bit at the first bit position (least significant bit) of each byte in the group, in the order of the bytes in the group, to form a new byte and adding the new byte to a zero-based array at index times eight; (iii) taking the bit at the second bit position of each byte in the group, in the order of the bytes in the group, to form a new byte and adding the new byte to the array at index times eight, plus one; (iv) taking the bit at the third bit position of each byte in the group, in the order of the bytes in the group, to form a new byte and adding the new byte to the array at index times eight, plus two; (v) taking the bit at the fourth bit position of each byte in the group, in the order of the bytes in the group, to form a new byte and adding the new byte to the array at index times eight, plus three; (vi) taking the bit at the fifth bit position of each byte in the group, in the order of the bytes in the group, to form a new byte and adding the new byte to the array at index times eight, plus four; (vii) taking the bit at the sixth bit position of each byte in the group, in the order of the bytes in the group to form a new byte and adding the new byte to the array at index times eight, plus five; (viii) taking the bit at the seventh bit position of each byte in the group, in the order of the bytes in the group to form a new byte and adding the new byte to the array at index times eight, plus six; (ix) taking the bit at the eighth bit position (most significant bit) of each byte in the group, in the order of the bytes in the group to form a new byte and adding the new byte to the array at index times eight, plus seven. The resulting array contains the padded Plaintext. Padding is removed from the padded Plaintext to form Plaintext.

DETAILED DESCRIPTION

FIG. 1 shows eight sequential data bytes in binary 101 that are rotated counterclockwise and displayed right to left, which is least significant byte to most significant byte 102, where the bits in common bit positions of the eight bytes are collected with byte #1 representing the least significant bits and byte #8 representing the most significant bits to form eight new bytes 103 with each new byte added to a separate partition 104.

FIG. 2 shows eight sequential data bytes in binary 201 that are padded with eight padding bytes by prepending the padding bytes to the data bytes with the number of padding bytes stored in the first padding byte 202, and the padded data bytes are transformed and partitioned with the first eight transformed bytes occupying the first position in each of eight partitions and the second eight transformed bytes occupying the second position in the partitions 203.

FIG. 3 shows sixteen partitioned data bytes after decryption 301, reverse transformed 302, and padding removed to recover plaintext 303.

FIG. 4 shows the data padding divisor 406 associated with various asymmetric and symmetric encryption 401 ciphers 402 that are block or stream ciphers 403 with a corresponding block size 404 and whether encryption padding is used by the cipher 405.

FIG. 5 shows the highest data padding divisor 502 for groups of eight asymmetric or symmetric ciphers, where each cipher and mode (if any) in each group has been assigned to a partition 501.

FIG. 6 shows that GEE is limited to using asymmetric or symmetric key-based cipher algorithms 601, 607, and eight partitions 602. A cipher and its mode (if any) 603, key-value 604, key size 605, and padding type 606 assigned to each partition may be different or the same as another partition. GEE is limited to asymmetric ciphers 608 that produce ciphertext whose length is equal to the cipher's key length or symmetric ciphers 608 that are block or stream ciphers.

FIG. 7 shows that for current single key encryption 701, the security level bits 704, the corresponding maximum number of operations to break the encryption 705, and the maximum message size 706 for the RSA asymmetric encryption cipher using a 1024 bit key size and various padding types 703 for five examples 702 compared to the security level bits 710, the corresponding maximum number of operations to break the encryption 711, and the maximum message size 712 for GEE 707 using the same RSA cipher, key size, and padding type for each partition 709 for five examples 708 and a sixth example 708 of GEE using the RSA cipher, various key sizes, and OAEP w/SHA-256 padding type for the partitions 709.

FIG. 8 shows that for current encryption 801, the security level bits 804 and corresponding maximum number of operations to break the encryption 805 by various symmetric encryption ciphers and key sizes 803 for six examples 802 compared to the security level bits 809 and corresponding maximum number of operations to break the encryption 810 for GEE 806 with six examples 807 using the same encryption cipher and key size for each partition 808 and a seventh example 807 using various ciphers and key sizes for the partitions 808.

Figure 9:
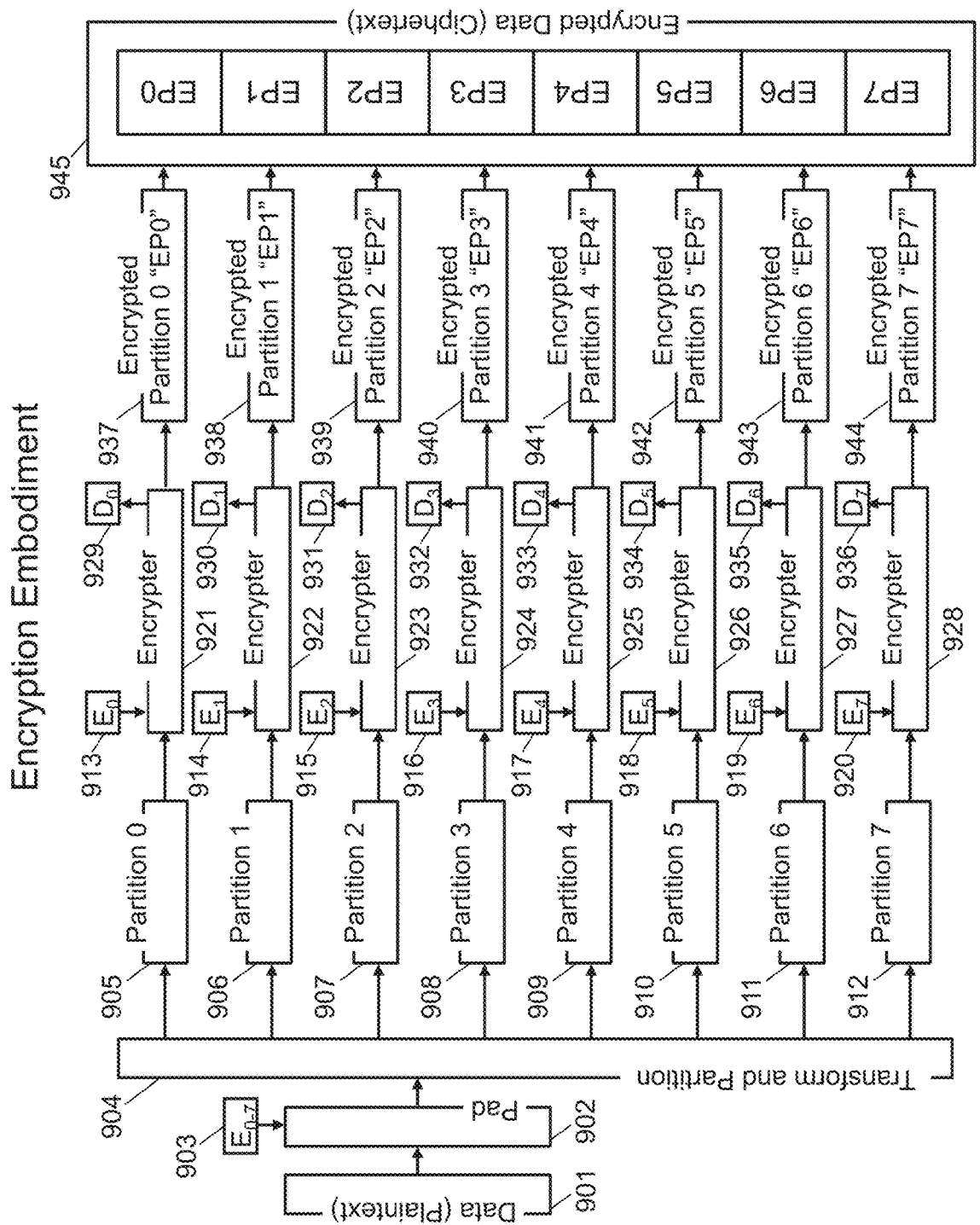
FIG. 9 depicts an embodiment of the GEE encryption process, where input data is padded considering encryption parameters ("$E_{0-7}$"); padded data is transformed and partitioned; each partition is encrypted using the partition's encryption parameters ("$E_{partition\ index}$"); each partition's decryption parameters ("$D_{partition\ index}$") are output; and encrypted partitions are combined and output to form encrypted data, where the method of the invention may be implemented according to a preferred embodiment.

FIG. 9 depicts an embodiment of the GEE encryption process, where input data 901 is padded 902 considering encryption parameters 903; padded data is transformed and partitioned 904, resulting in eight partitions 905-912; each partition 905-912 is encrypted by an encrypter 921-928 using the partition's encryption parameters 913-920; each partition's decryption parameters 929-936 are output; and encrypted partitions 937-944 are combined and output to form encrypted data 945, where the method of the invention may be implemented according to a preferred embodiment.

Figure 10:
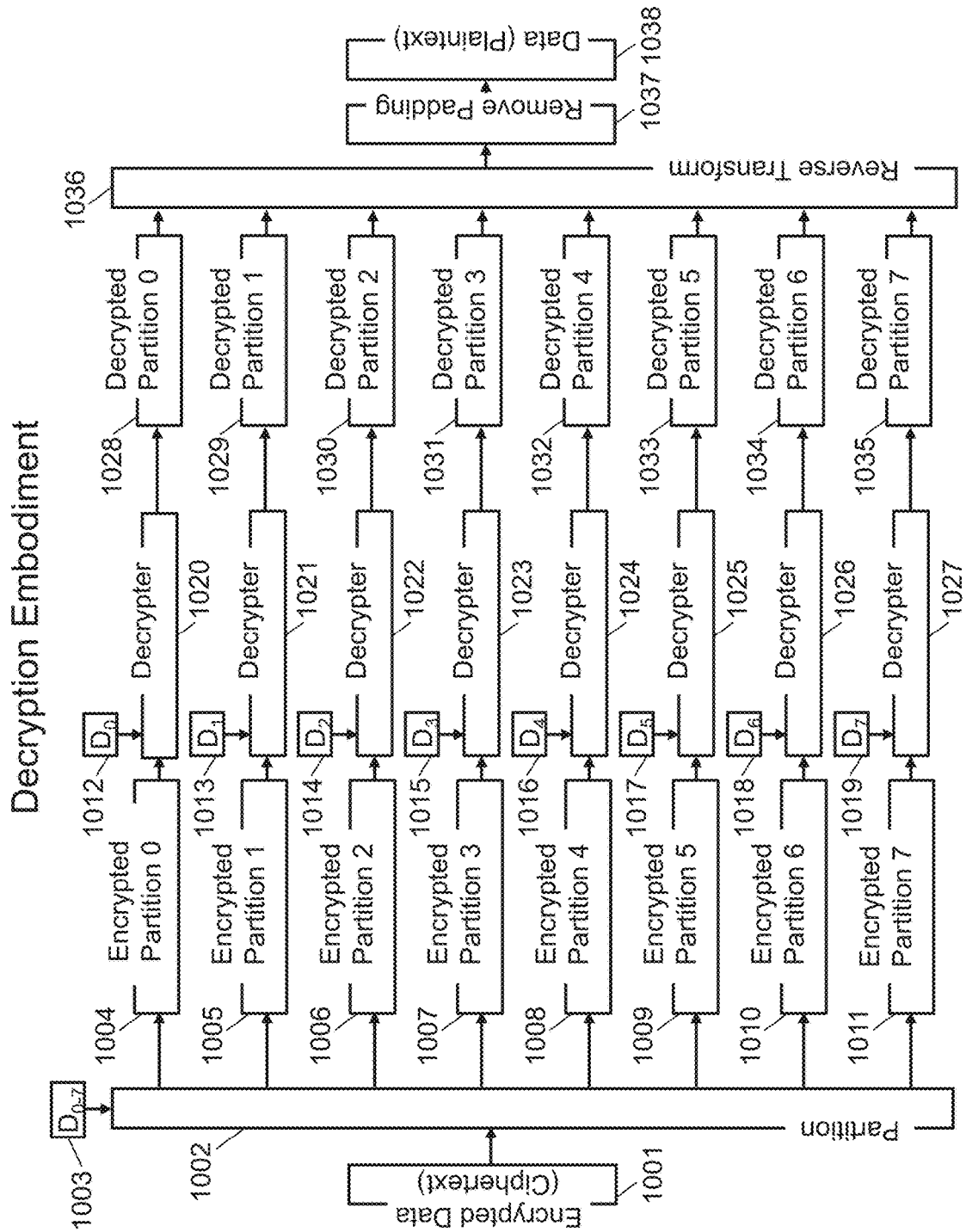
FIG. 10 depicts an embodiment of the GEE decryption process, where priorly GEE encrypted data is partitioned considering decryption parameters ("$D_{0-7}$"); partitions are decrypted using each decrypter's decryption parameters ("$D_{partition\ index}$"); decrypted partitions are reverse transformed to form padded plaintext; and padding removed to output plaintext, where the method of the invention may be implemented according to a preferred embodiment.

FIG. 10 depicts an embodiment of the GEE decryption process, where priorly GEE encrypted data 1001 is partitioned 1002 considering decryption parameters 1003, resulting in eight encrypted partitions 1004-1011; each encrypted partition 1004-1011 is decrypted by a decrypter 1020-1027 using the decrypter's decryption parameters 1012-1019; decrypted partitions 1028-1035 are reversed transformed 1036 to form padded plaintext; and padding is removed 1037 to output plaintext 1038, where the method of the invention may be implemented according to a preferred embodiment.

Figure 11:
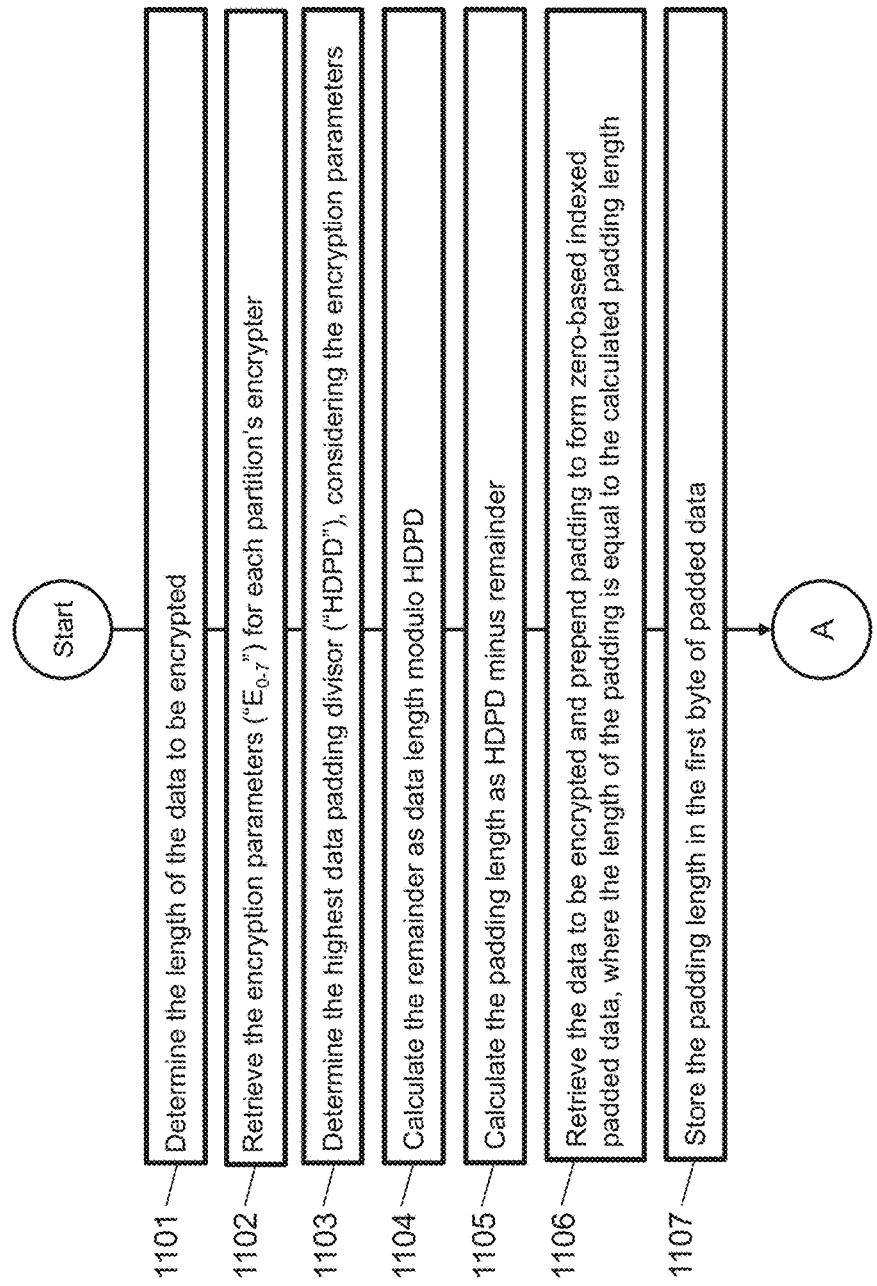
FIG. 11 shows a flowchart of the data encryption process starting, where the length of the data to be encrypted is determined; the encryption parameters ("$E_{0-7}$") are retrieved and the highest data padding divisor is determined; the data to be encrypted is retrieved and padded with a calculated number of padding bytes to form zero-based indexed padded data; and the number of padding bytes is stored in the first byte of the padded data with a continuation on FIG. 12.
Figure 12:
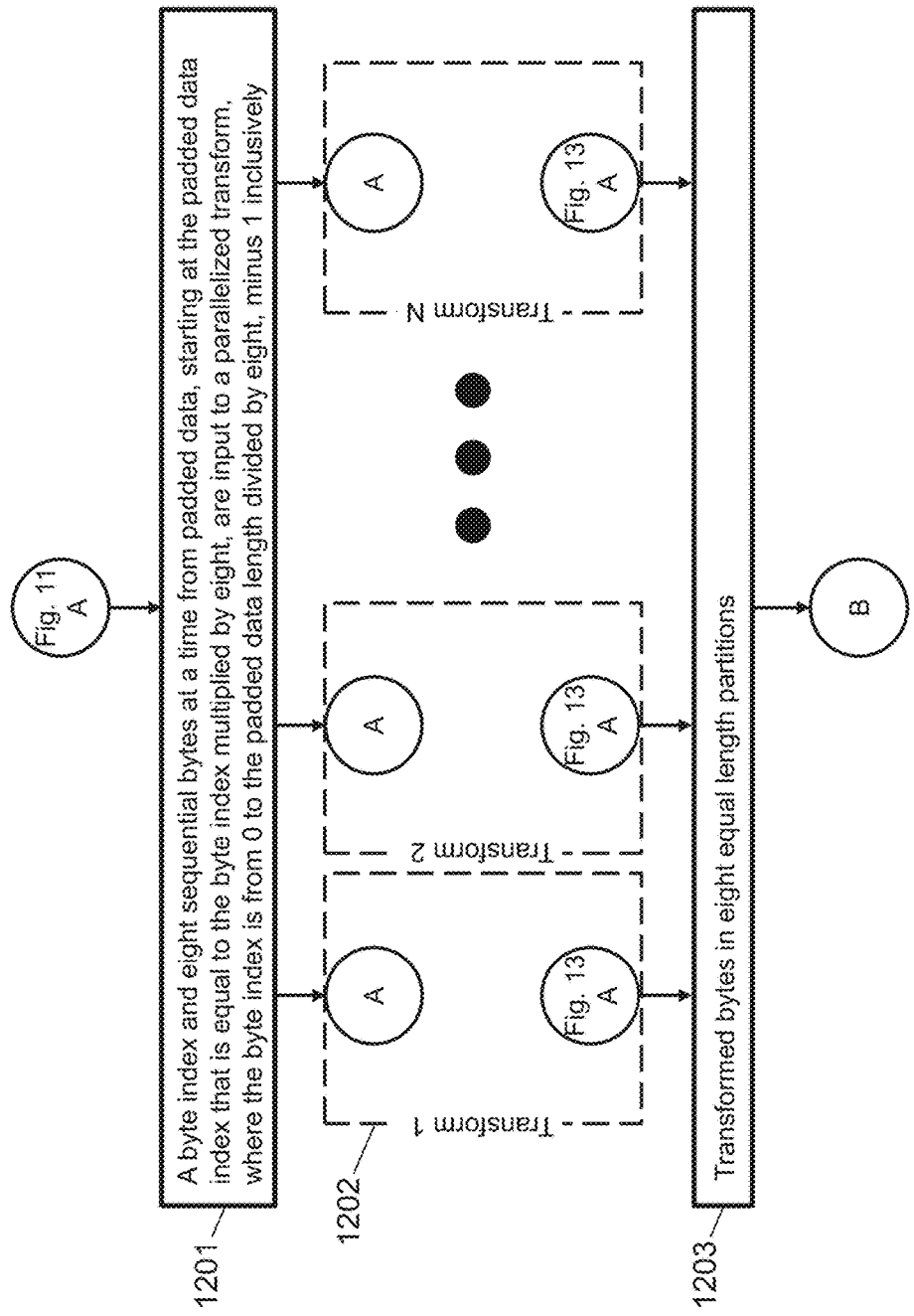
FIG. 12 shows a continuation of the flowchart depicted in FIG. 11 designation A and the parallelized operation of inputting a byte index and eight sequential bytes at a time from padded data, starting at the padded data index that is equal to the byte index multiplied by eight, to a transform, where the byte index is from 0 to the padded data length divided by eight, minus 1 inclusively, with a continuation on FIG. 13 and continuations from the flowchart depicted in FIG. 13 designation A, resulting in transformed bytes in eight equal length partitions with a continuation on FIG. 14.

FIG. 11 shows a flowchart of the data encryption process starting, where the length of the data to be encrypted is determined 1101; the encryption parameters for each partition's encrypter are retrieved 1102; the highest data padding divisor ("HDPD") considering the encryption parameters is determined 1103; the remainder is calculated as data length modulo HDPD 1104; the data padding length is calculated as HDPD minus remainder 1105; the data to be encrypted is retrieved and padding prepended to form zero-based indexed padded data 1106, where the length of the padding is equal to the calculated padding length; and the padding length is stored in the first byte of the padded data 1107 with a continuation on FIG. 12.

FIG. 12 shows a continuation of the flowchart depicted in FIG. 11 designation A, where a byte index and eight sequential bytes at a time from padded data, starting at the padded data index that is equal to the byte index multiplied by eight, where the byte index is from 0 to the padded data length divided by eight, minus 1 inclusively 1201, are input to a parallelized transform 1202 with a continuation on FIG. 13. There are continuations from the flowchart depicted in FIG. 13 designation A that result in transformed bytes in eight equal length partitions 1203 with a continuation on FIG. 14.

FIG. 13 shows a continuation of the flowchart depicted in FIG. 12 designation A, where the first bit of each of the eight bytes in sequential order is copied to form a new byte that is added to zero-based indexed partition zero at the position given by the byte index 1301; the second bit of each of the eight bytes in sequential order is copied to form a new byte that is added to zero-based indexed partition one at the position given by the byte index 1302; the third bit of each of the eight bytes in sequential order is copied to form a new byte that is added to zero-based indexed partition two at the position given by the byte index 1303; the fourth bit of each of the eight bytes in sequential order is copied to form a new byte that is added to zero-based indexed partition three at the position given by the byte index 1304; the fifth bit of each of the eight bytes in sequential order is copied to form a new byte that is added to zero-based indexed partition four at the position given by the byte index 1305; the sixth bit of each of the eight bytes in sequential order is copied to form a new byte that is added to zero-based indexed partition five at the position given by the byte index 1306; the seventh bit of each of the eight bytes in sequential order is copied to form a new byte that is added to zero-based indexed partition six at the position given by the byte index 1307; and the eighth bit of each of the eight bytes in sequential order is copied to form a new byte that is added to zero-based indexed partition seven at the position given by the byte index 1308 with a continuation on FIG. 12.

Figure 15:
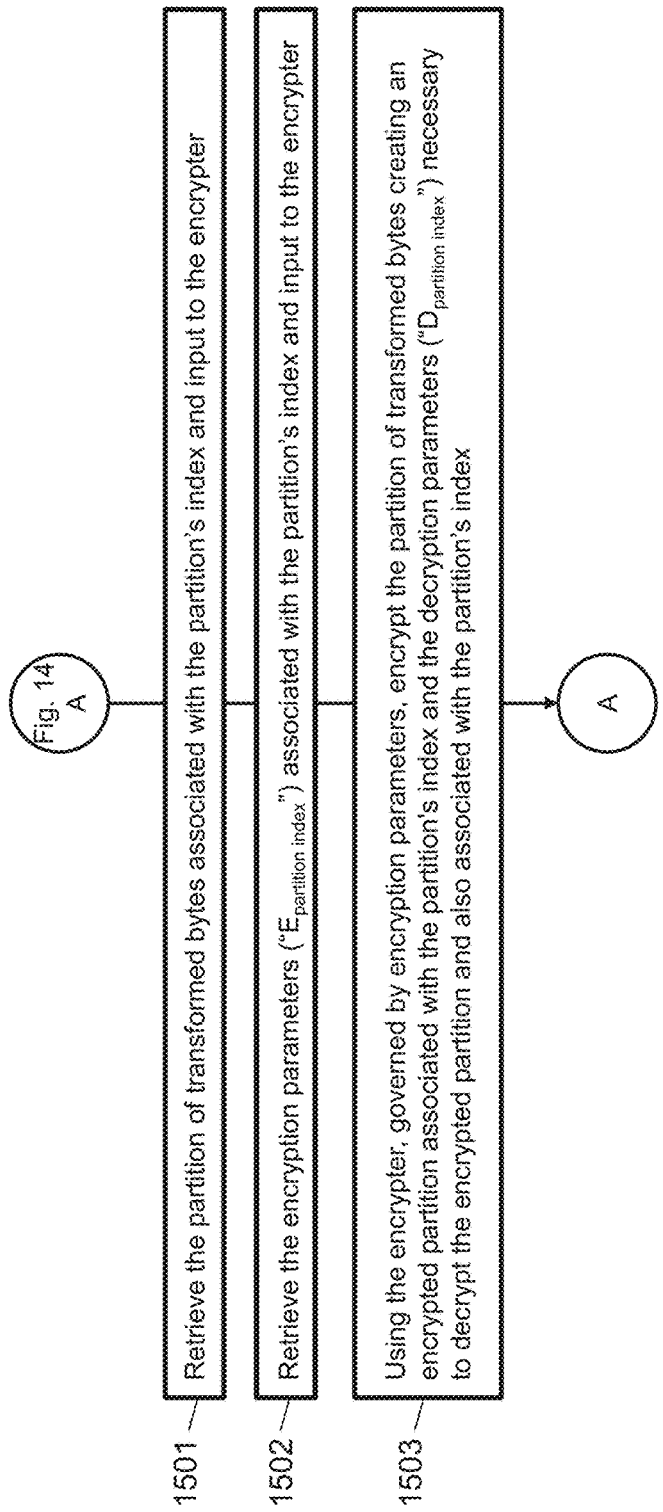
FIG. 15 shows a continuation of the flowchart depicted in FIG. 14 designation A, where a partition of transformed bytes and encryption parameters associated with the partition's index ("$E_{partition\ index}$") are retrieved and input to the encrypter, which generates an encrypted partition and the decryption parameters ("$D_{partition\ index}$") necessary to decrypt the encrypted partition and also associated with the partition's index with a continuation on FIG. 14.

FIG. 14 shows a continuation of the flowchart depicted in FIG. 12 designation B, where a partition's index that is from zero to seven inclusively 1401 is input to a parallelized encrypter 1402 with a continuation on FIG. 15. There are continuations from the flowchart depicted in FIG. 15 designation A, where the decryption parameters associated with each encrypted partition in partition order from zero to seven are output 1403. The encrypted data partitions, in order from partition zero to seven, are output to form encrypted data (ciphertext) 1404, and the GEE encryption process is done.

FIG. 15 shows a continuation of the flowchart depicted in FIG. 14 designation A, where the partition of transformed bytes associated with the partition's index is retrieved and input to the encrypter 1501; the encryption parameters associated with the partition's index are retrieved, and input to the encrypter 1502; and the encrypter, governed by the encryption parameters, encrypts the partition of transformed bytes creating (i) an encrypted partition associated with the partition's index and (ii) the decryption 27 parameters necessary to decrypt the encrypted partition and also associated with the partition's index 1503 with a continuation on FIG. 14.

Figure 16:
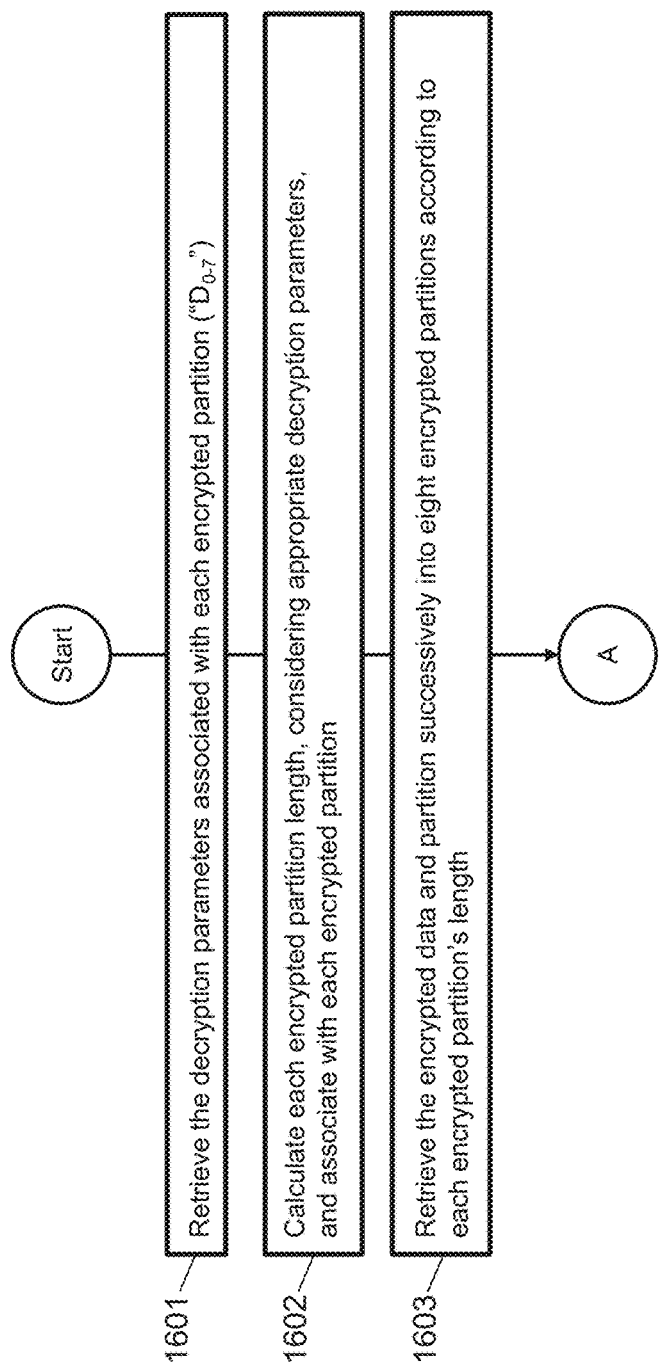
FIG. 16 shows a flowchart of the encrypted data decryption process starting, where the decryption parameters associated with each encrypted partition ("Do-7") are retrieved; each encrypted partition length is calculated considering appropriate decryption parameters; the encrypted data is retrieved and partitioned successively into eight encrypted partitions according to each encrypted partition's length with a continuation on FIG. 17.

FIG. 16 shows a flowchart of the encrypted data decryption process starting, where the decryption parameters for each encrypted partition are retrieved 1601. Each encrypted partition length is calculated, considering appropriate decryption parameters, and associated with each encrypted partition 1602. The encrypted data is retrieved and partitioned successively into eight encrypted partitions according to each encrypted partition's length 1603 with a continuation on FIG. 17.

Figure 17:
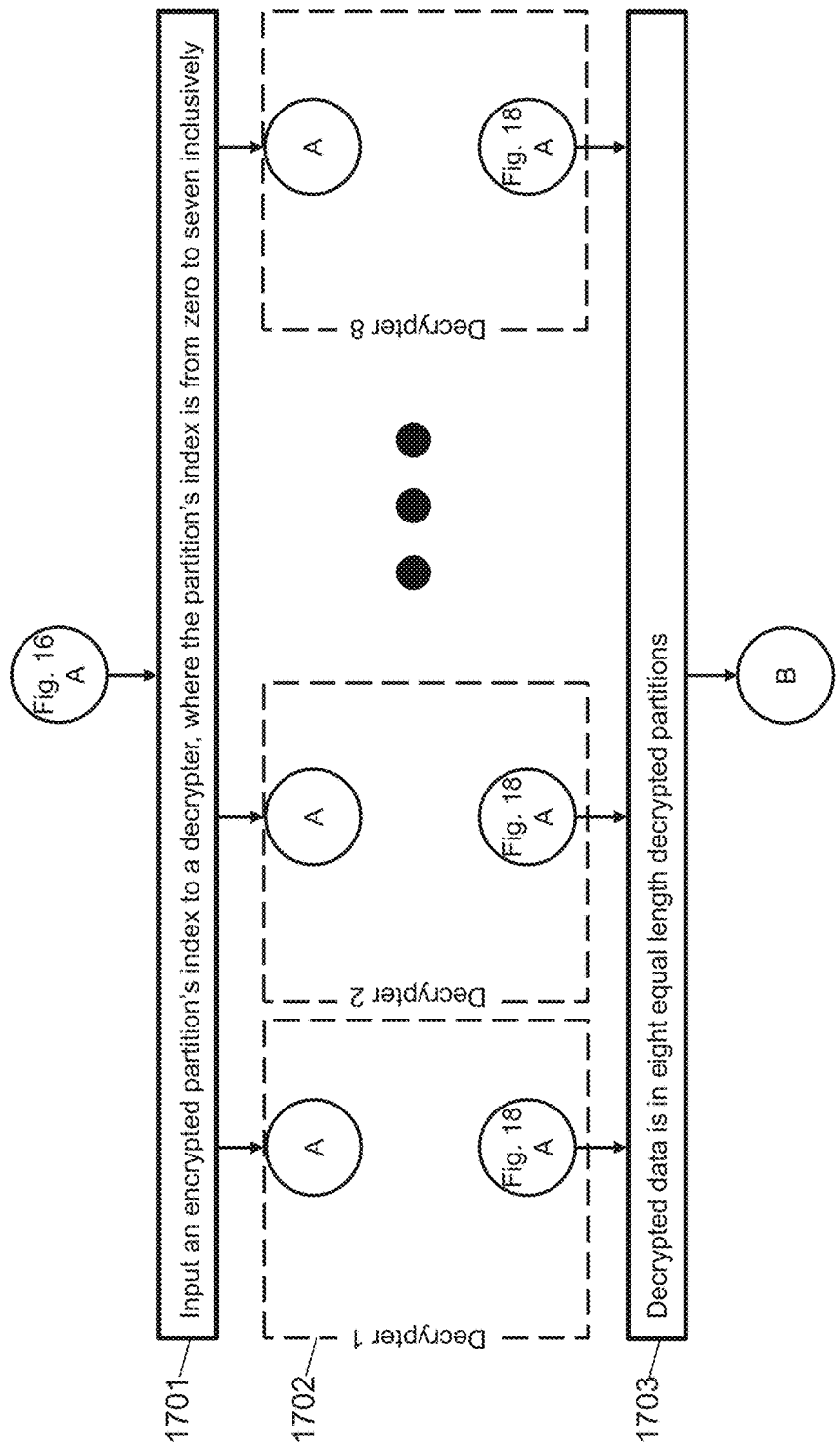
FIG. 17 shows a continuation of the flowchart depicted in FIG. 16 designation A and the parallelized operation of inputting an encrypted partition's index to a decrypter, where the partition's index is from zero to seven inclusively with a continuation on FIG. 18 and continuations from the flowchart depicted in FIG. 18 designation A, resulting in decrypted data in eight equal length decrypted partitions with a continuation on FIG. 19.
Figure 18:
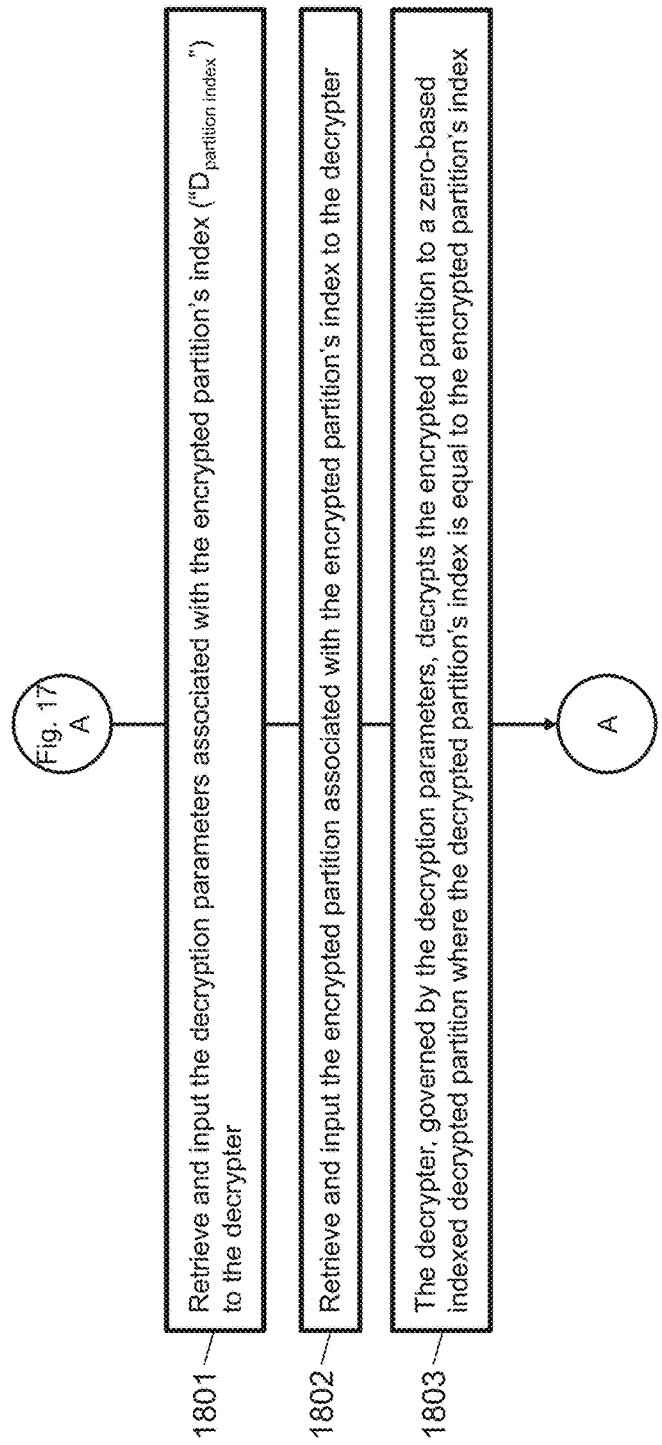
FIG. 18 shows a continuation of the flowchart depicted in FIG. 17 designation A, where the decryption parameters and the encrypted partition associated with the encrypted partition's index are retrieved and input to the decrypter; and the decrypter, governed by the decryption parameters, decrypts the encrypted partition and stores the decrypted data in a zero-based indexed decrypted partition where the decrypted partition's index is equal to the encrypted partition's index with a continuation on FIG. 17.

FIG. 17 shows a flowchart that continues from FIG. 16 designation A, where an encrypted partition's index, that is from zero to seven inclusively 1701, is input to a parallelized decrypter 1702 with a continuation on FIG. 18. There are continuations from the flowchart depicted in FIG. 18 designation A, where the resulting decrypted data is in eight equal length decrypted partitions 1703 with a continuation on FIG. 19.

FIG. 18 shows a flowchart that continues from FIG. 17 designation A, where the decryption parameters associated with the encrypted partition's index are retrieved, and input to the decrypter 1801 and the encrypted partition associated with the encrypted partition index is retrieved and input to the decrypter 1802. The decrypter, governed by the decryption parameters, decrypts the encrypted partition to a zero-based indexed decrypted partition where the decrypted partition's index is equal to the encrypted partition's index 1803 with a continuation on FIG. 17.

Figure 19:
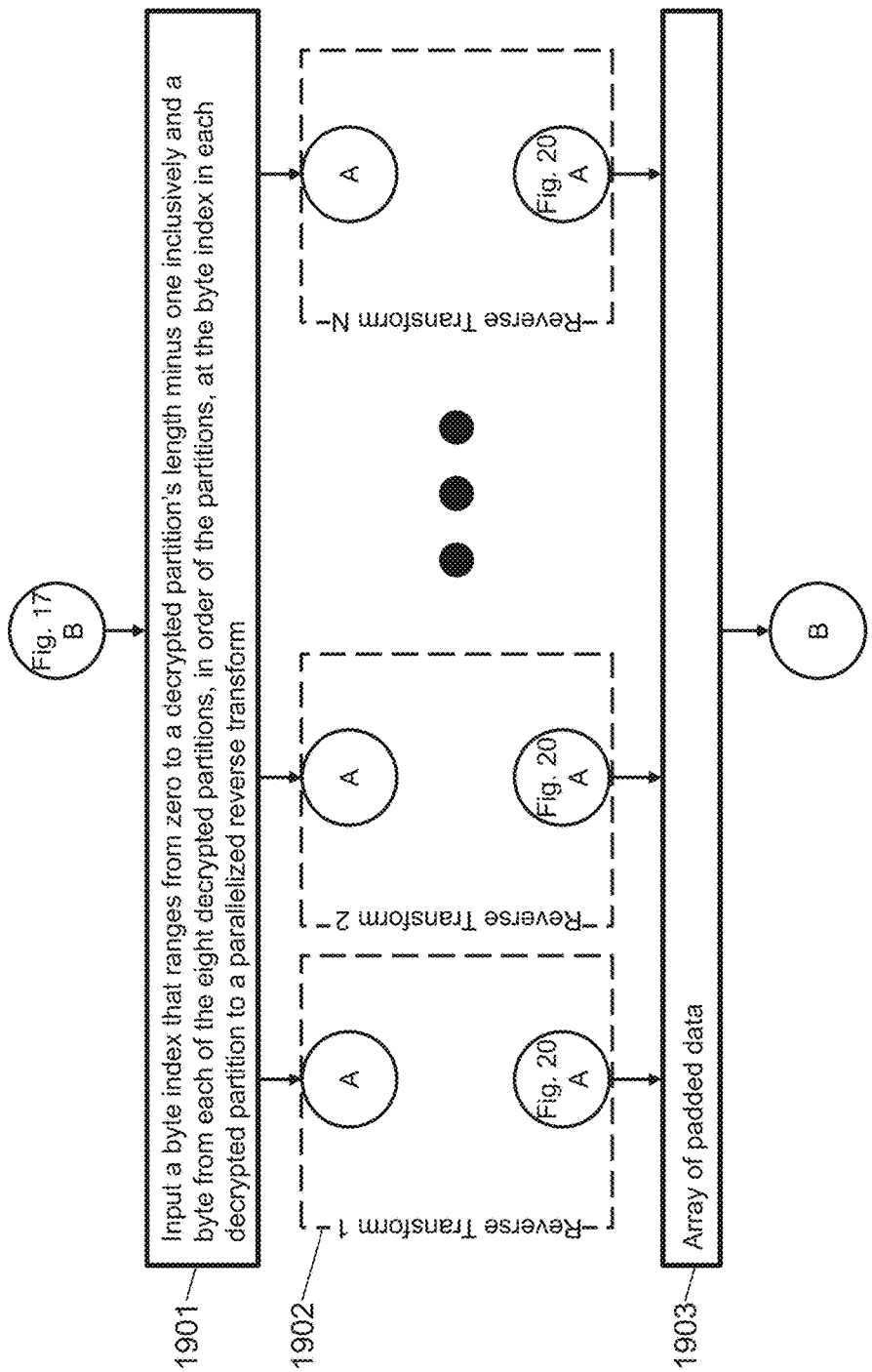
FIG. 19 shows a continuation of the flowchart depicted in FIG. 17 designation B and the parallelized operation of inputting a byte index ranging from zero to a decrypted partition's length minus one inclusively and a byte from each of eight decrypted partitions, in order of the partitions, at byte index in each decrypted partition to a reverse transform with a continuation on FIG. 20 and continuations from the flowchart depicted in FIG. 20 designation A, resulting in an array of padded data with a continuation on FIG. 21.

FIG. 19 shows a flowchart that continues from FIG. 17 designation B, where a byte index that ranges from zero to a decrypted partition's length minus one inclusively and a byte from each of the eight decrypted partitions, in order of the partitions, at the byte index in each decrypted partition 1901 are input to a parallelized reverse transform 1902 with a continuation on FIG. 20. There are continuations from the flowchart depicted in FIG. 20 designation A that result in an array of padded data 1903 with a continuation on FIG. 21.

FIG. 20 shows a flowchart that continues from FIG. 19 designation A, where the first bit of each of the eight bytes, in sequential order, is copied to form a new byte that is added to a zero-based indexed array at the array index that is equal to the byte index multiplied by eight 2001; the second bit of each of the eight bytes, in sequential order, is copied to form a new byte that is added to the array at the array index that is equal to the byte index multiplied by eight, plus one 2002; the third bit of each of the eight bytes, in sequential order, is copied to form a new byte that is added to the array at the array index that is equal to the byte index multiplied by eight, plus two 2003; the fourth bit of each of the eight bytes, in sequential order, is copied to form a new byte that is added to the array at the array index that is equal to the byte index multiplied by eight, plus three 2004; the fifth bit of each of the eight bytes, in sequential order, is copied to form a new byte that is added to the array at the array index that is equal to the byte index multiplied by eight, plus four 2005; the sixth bit of each of the eight bytes, in sequential order, is copied to form a new byte that is added to the array at the array index that is equal to the byte index multiplied by eight, plus five 2006; the seventh bit of each of the eight bytes, in sequential order, is copied to form a new byte that is added to the array at the array index that is equal to the byte index multiplied by eight, plus six 2007; and the eighth bit of each of the eight bytes, in sequential order, is copied to form a new byte that is added to the array at the array index that is equal to the byte index multiplied by eight, plus seven 2008 with a continuation on FIG. 19.

Figure 21:
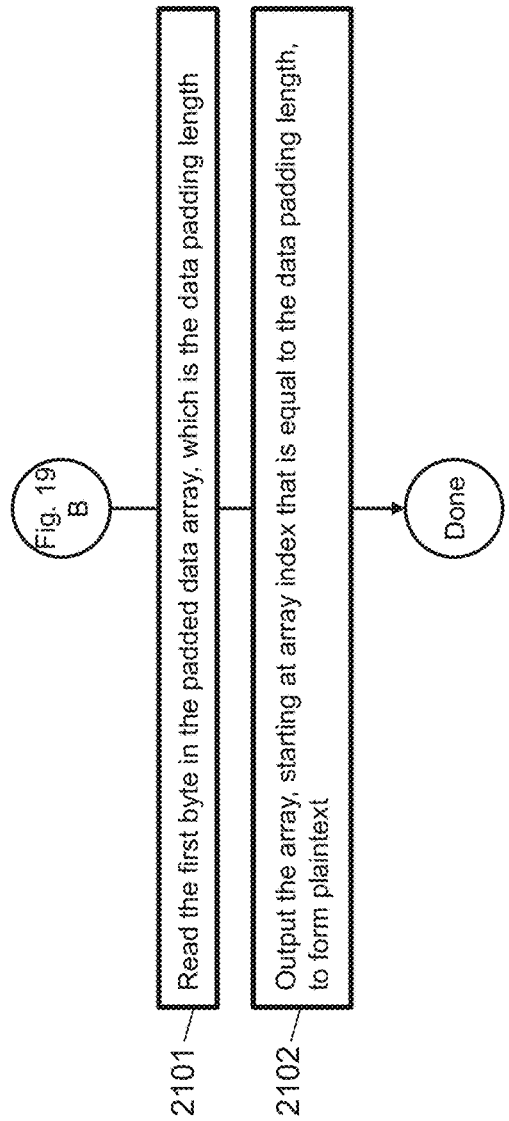
FIG. 21 shows a continuation of the flowchart depicted in FIG. 19 designation B and reading the data padding length from the first byte in the padded data array and outputting the array, starting at the array index that is equal to the data padding length, to form plaintext and the GEE decryption process is done.

FIG. 21 shows a flowchart that continues from FIG. 19 designation B, where the first byte is read from the padded data array, which is the data padding length 2101. The array is output, starting at the array index that is equal to the data padding length, to form plaintext 2102, and the GEE decryption process is done.

Figure 22:
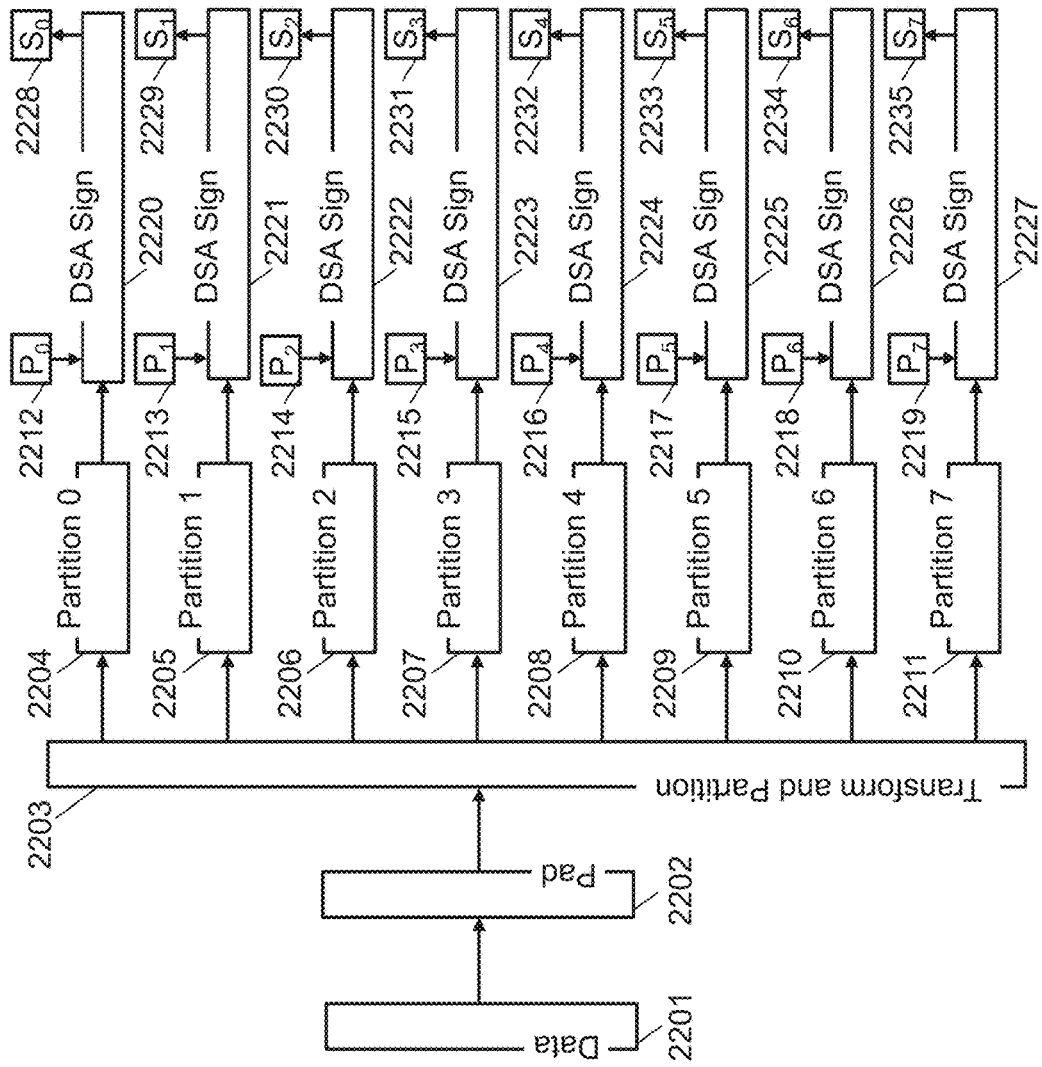
FIG. 22 depicts an embodiment of the digital signature creation process, where input data is padded; padded data is transformed and partitioned; each partition is hashed and signed by a digital signature algorithm using compatible digital signature parameters ("$P_{partition\ index}$") thereby creating signed bytes for each partition; and each partition's signed bytes are output ("$S_{partition\ index}$") and combined to form an enhanced digital signature, where the method of the invention may be implemented according to a preferred embodiment.

FIG. 22 depicts an embodiment of the digital signature creation process, where input data 2201 is padded 2202; padded data is transformed and partitioned 2203; each partition 2204-2211 is hashed and signed by a digital signature algorithm 2220-2227 using compatible digital signature parameters 2212-2219 thereby creating signed bytes for each partition; and each partition's signed bytes are output 2228-2235 and combined to form an enhanced digital signature, where the method of the invention may be implemented according to a preferred embodiment.

Figure 23:
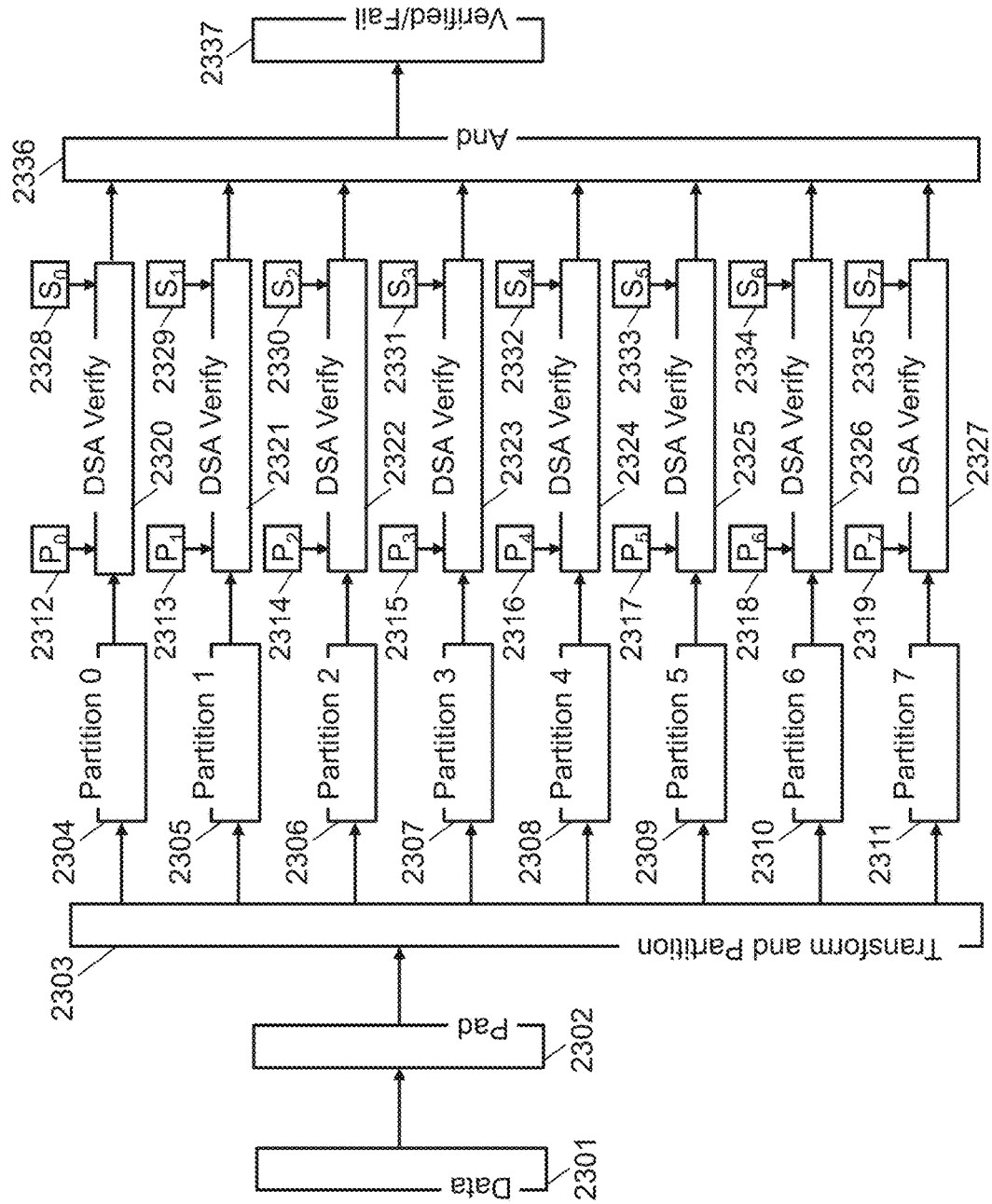
FIG. 23 depicts an embodiment of the digital signature verification process, where data is padded; padded data is transformed and partitioned; each partition is hashed by a digital signature algorithm using digital signature parameters ("$P_{partition\ index}$"), thereby creating a hash value for each partition; each partition's signed bytes ("$S_{partition\ index}$") are decrypted by a digital signature algorithm using digital signature parameters, thereby creating a decrypted hash value for each partition; each partition's hash value is compared to the corresponding decrypted hash value for equivalency and each such comparison's boolean result is ANDed together to verify the enhanced digital signature or indicates a failure to match, where the method of the invention may be implemented according to a preferred embodiment.

FIG. 23 depicts an embodiment of the digital signature verification process, where data 2301 is padded 2302; padded data is transformed and partitioned 2303; each partition 2304-2311 is hashed by a digital signature algorithm 2320-2327 using digital signature parameters 2312-2319, thereby creating a hash value for each partition; each partition's signed bytes 2328-2335 are decrypted by a digital signature algorithm 2320-2327 using digital signature parameters 2312-2319, thereby creating a decrypted hash value for each partition; each partition's hash value is compared by its digital signature algorithm 2320-2327 to the corresponding decrypted hash value for equivalency; and each such comparison's boolean result is ANDed together 2336 to verify the enhanced digital signature or indicates a failure to match 2337, where the method of the invention may be implemented according to a preferred embodiment.

Figure 24:
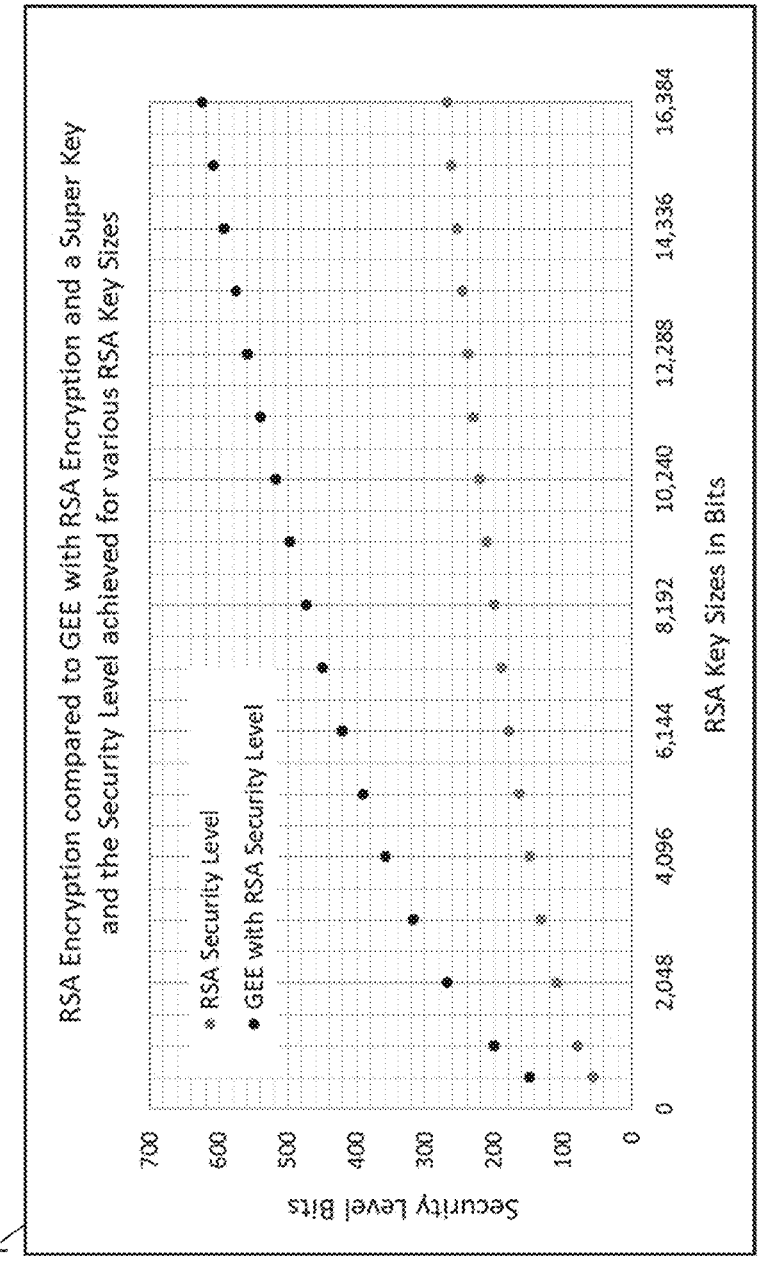
FIG. 24 shows a graph of the Security Level achieved by RSA encryption for various key sizes compared to the Security Level achieved by GEE with RSA encryption and a Super Key.

FIG. 24 shows a graph of Security Level bits versus RSA Key sizes in bits for various Key sizes, for current RSA encryption and GEE with RSA encryption and a Super Key 2401.

Figure 25:
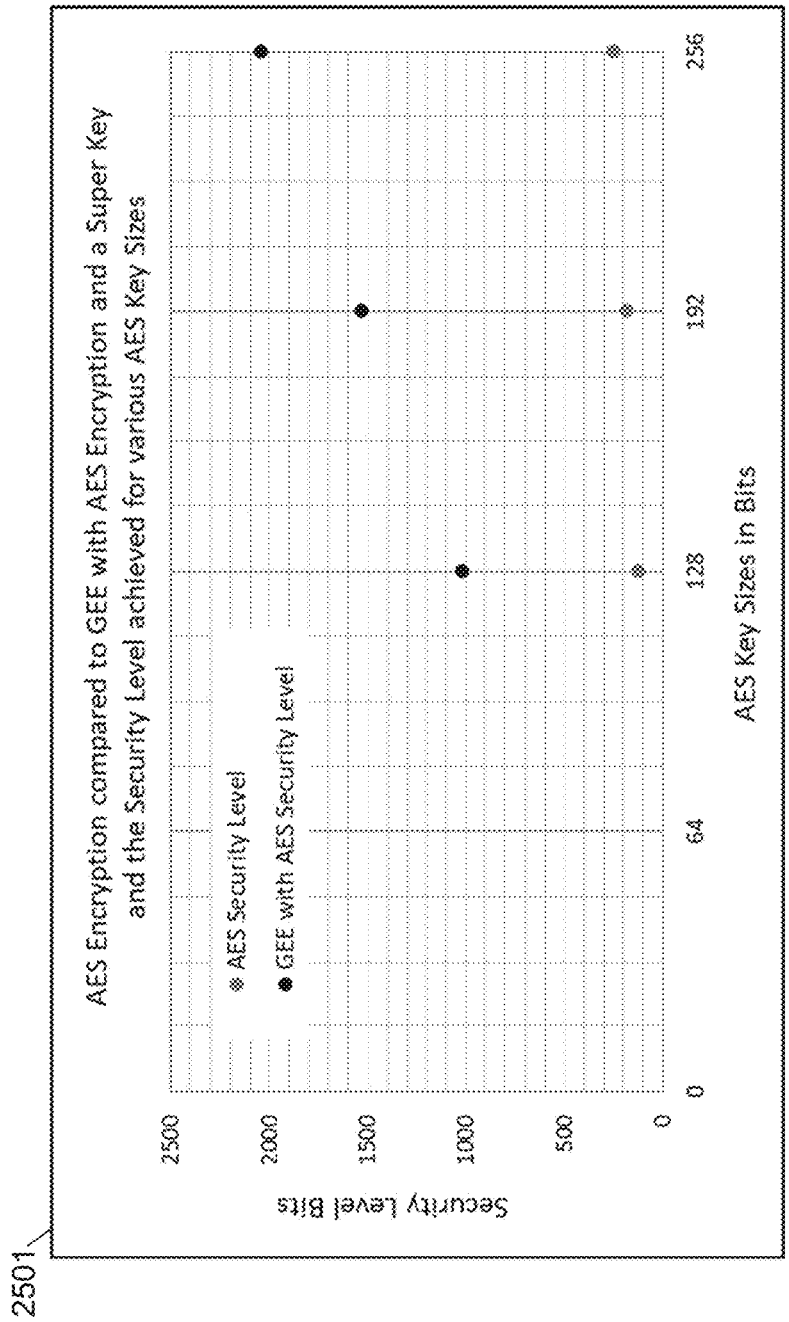
FIG. 25 shows a graph of the Security Level achieved by AES encryption for various key sizes compared to the Security Level achieved by GEE with AES encryption and a Super Key.

FIG. 25 shows a graph of Security Level bits versus AES Key sizes in bits for various Key sizes, for current AES encryption and GEE with AES encryption and a Super Key 2501.

SUMMARY

This invention significantly increases the security of digital signatures with enhanced proof of data integrity, signatory authentication, and signatory non-repudiation without modification to underlying signature algorithms. In contrast to prior art that is a signature algorithm or modifies some operational aspect of a signature algorithm, such as hashing, encryption, or keys, this invention pads plaintext to create padded plaintext and copies bit values from common bit positions of said padded plaintext bytes into eight partitions before independently signing each partition. This is the enabling idea of the invention, where the first bit of a plaintext byte is copied into a first partition, the second bit of the plaintext byte is copied into a second partition . . . the eighth bit of the plaintext byte is copied into an eighth partition. All the first bits of the plaintext bytes end up in the first partition, all the second bits of the plaintext bytes end up in the second partition . . . all the eighth bits of the plaintext bytes end up in the eighth partition. Each partition of bits is treated as new bytes, containing one-eighth of the padded plaintext. Each partition of padded plaintext bytes, a specified hash algorithm, and a different private key from a public-private key pair is input to a signature algorithm which signs such partition of padded plaintext bytes by hashing such partition of padded plaintext bytes producing a hash value that is encrypted using asymmetric encryption with the private key. The encrypted hash values for the eight partitions are taken together to form the digital signature. The independent signing of the eight partitions is performed in parallel and considering each partition contains one-eighth of the padded plaintext bytes, the signing is fast. As signature verification requires eight signature algorithms each utilizing a specified hash algorithm and the public key from the public-private key pair used for signing, the digital signature is significantly improved compared to a digital signature that has been created with a single signature algorithm utilizing a hash algorithm and key.

The invention claimed is:

1. A process for plaintext signing, the process utilizing:
    computing resources;
    eight asymmetric cryptography digital signature algorithms;
    eight private keys from eight public-private key pairs;
    parameters for each said signature algorithm; and
    plaintext;
    the process for plaintext signing comprising:
        padding plaintext bytes forming padded plaintext;
        assigning to each bit of the padded plaintext bytes a bit position wherein said assigned bit position refers to one of eight possible bit positions;

copying bit values from common bit positions of said padded plaintext bytes to form eight partitions of bit positions of padded plaintext bytes;

independently signing, using one of each signature algorithms assigned to a particular bit position, each said partition of bit positions of padded plaintext bytes to form eight partitions of signed bytes wherein each of said eight partitions of bit positions of padded plaintext bytes is independently signed with a signature algorithm and parameters including a specified hash algorithm and different private key from a public-private key pair for each such partition; and combining said eight partitions of signed bytes to form digital signature.

2. The process of claim 1, wherein said padding plaintext bytes forming padded plaintext is evenly divisible by eight with first padding byte containing a number of padding bytes so added to plaintext bytes.

3. The process of claim 1, wherein said copying bit values from common bit positions of said padded plaintext bytes is performed eight bytes at a time, from a sequence of padded plaintext bytes, where a byte is added to one of eight partitions corresponding to a common bit position.

4. The process of claim 1, wherein the parameters for each said signature algorithms are compatible with said signature algorithm.

5. The process of claim 1, wherein said one of each signature algorithms uses the hash algorithm specified by the said hash algorithm parameter to hash the said partition of bit positions of padded plaintext bytes to create a hash value for said partition.

6. The process of claim 5, wherein said one of each signature algorithms uses private key parameter to encrypt said hash value to form an encrypted hash value which is a partition of signed bytes.

7. The process of claim 1, wherein said eight partitions of signed bytes are combined in a defined order to form digital signature.

8. A process for digital signature verification, the process utilizing:
computing resources;
eight asymmetric cryptography digital signature algorithms;
eight public keys from eight public-private key pairs;
parameters for each said signature algorithm;
plaintext; and
digital signature of said plaintext;
the process for digital signature verification comprising:
padding plaintext bytes forming padded plaintext;
assigning to each bit of the padded plaintext bytes a bit position wherein said assigned bit position refers to one of eight possible bit positions;
copying bit values from common bit positions of said padded plaintext bytes to form eight partitions of bit positions of padded plaintext bytes;
partitioning digital signature into eight partitions each partition containing signed bytes of a bit position;
independently verifying each partition containing signed bytes of a bit position using one of each signature algorithms, said bit position of padded plaintext bytes, and parameters assigned to that bit position that were first used to sign such partition of bit positions of padded plaintext bytes; and
verifying digital signature upon successful verification of all said eight partitions.

9. The process of claim 8, wherein said padding plaintext bytes forming padded plaintext is evenly divisible by eight with first padding byte containing a number of padding bytes so added to plaintext bytes.

10. The process of claim 8, wherein said copying bit values from common bit positions of said padded plaintext bytes is performed eight bytes at a time, from a sequence of padded plaintext bytes, where a byte is added to one of eight partitions corresponding to a common bit position.

11. The process of claim 8, wherein said partitioning digital signature includes allotting the signed bytes into eight partitions in same order as the eight partitions of signed bytes were first combined during signing to form such digital signature.

12. The process of claim 8, wherein said parameters assigned to a bit position include a hash algorithm and the public key that corresponds to a private key from a public-private key pair, where such hash algorithm and private key were first used to sign the said partition of bit positions of padded plaintext bytes.

13. The process of claim 8, wherein each signature algorithm assigned to a bit position uses a hash algorithm specified by its hash algorithm parameter to hash a corresponding partition of bit positions of padded plaintext bytes to create a hash value for such partition.

14. The process of claim 8, wherein each signature algorithm assigned to a bit position uses its public key parameter to decrypt a corresponding partition of signed bytes to form eight partitions of decrypted signed bytes where each partition represents a decrypted hash value.

15. The process of claim 8, wherein each signature algorithm assigned to a bit position uses a hash algorithm specified by its hash algorithm parameter to hash a corresponding partition of bit positions of padded plaintext bytes to create a hash value for such partition and each signature algorithm assigned to a bit position uses its public key parameter to decrypt a corresponding partition of signed bytes to form eight partitions of decrypted signed bytes where each partition represents a decrypted hash value and such hash value and such decrypted hash value for each of eight partitions of bit positions are compared for equivalency.

16. The process of claim 15, wherein the digital signature is verified when hash value and decrypted hash value for each of eight partitions of bit positions are equivalent.

* * * * *